United States Patent
Wang et al.

(10) Patent No.: US 12,068,892 B2
(45) Date of Patent: Aug. 20, 2024

(54) METHODS FOR REFERENCE SIGNAL MAPPING IN NON-LINEAR PRECODING MIMO TRANSMISSION

(71) Applicant: Telefonaktiebolaget LM Ericsson (publ), Stockholm (SE)

(72) Inventors: Zhao Wang, Täby (SE); Maksym Girnyk, Solna (SE); Roy Timo, Kungsängen (SE); Niklas Wernersson, Kungsängen (SE); Simon Järmyr, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 404 days.

(21) Appl. No.: 17/608,926

(22) PCT Filed: May 6, 2019

(86) PCT No.: PCT/SE2019/050396
§ 371 (c)(1),
(2) Date: Nov. 4, 2021

(87) PCT Pub. No.: WO2020/226539
PCT Pub. Date: Nov. 12, 2020

(65) Prior Publication Data
US 2022/0217023 A1    Jul. 7, 2022

(51) Int. Cl.
*H04L 25/03* (2006.01)
*H04B 7/06* (2006.01)
(Continued)

(52) U.S. Cl.
CPC ..... *H04L 25/03343* (2013.01); *H04B 7/0626* (2013.01); *H04B 17/345* (2015.01); *H04L 5/0048* (2013.01)

(58) Field of Classification Search
CPC ............ H04L 25/03343; H04L 5/0048; H04B 17/345; H04B 7/0626
See application file for complete search history.

(56) References Cited

U.S. PATENT DOCUMENTS

| | | | |
|---|---|---|---|
| 2012/0087430 A1* | 4/2012 | Forenza | H04B 7/0626 375/267 |
| 2012/0170525 A1* | 7/2012 | Sorrentino | H04L 5/0051 370/329 |

(Continued)

OTHER PUBLICATIONS

"3GPP TS 23.501 V16.0.0", 3rd Generation Partnership Project; Technical Specification Group Services and System Aspects; System Architecture for the 5G System; Stage 2 (Release 16), Mar. 2019, pp. 1-318.

(Continued)

*Primary Examiner* — Duc C Ho
(74) *Attorney, Agent, or Firm* — Murphy, Bilak & Homiller, PLLC

(57) ABSTRACT

Embodiments include methods for operating a network node in a wireless network. Such embodiments include applying non-linear precoding to a first data stream to remove a representation of expected inter-stream interference due to a second data stream, thereby generating a corrected first data stream. Such embodiments also include applying linear precoding to the corrected first data stream and to a first reference signal (RS) stream to generate a first signal layer. The first RS stream is not corrected for the expected inter-stream interference prior to applying the linear precoding. Such embodiments also include transmitting the first signal layer to a user equipment (UE). Other embodiments include complementary methods performed by a UE, as well as network nodes and UEs configured to perform operations corresponding to such methods.

20 Claims, 15 Drawing Sheets

(51) Int. Cl.
*H04B 17/345* (2015.01)
*H04L 5/00* (2006.01)

(56) References Cited

U.S. PATENT DOCUMENTS

2013/0022087 A1* 1/2013 Chen ............... H04L 5/0094
375/147
2013/0223269 A1  8/2013  To et al.
2013/0286949 A1  10/2013  Tomeba et al.

OTHER PUBLICATIONS

"3GPP TS 33.401 V15.7.0", 3rd Generation Partnership Project; Technical Specification Group Services and System Aspects; 3GPP System Architecture Evolution (SAE); Security architecture (Release 15), Mar. 2019, pp. 1-163.
"Discussion on Non-linear Precoding Scheme for NR", 3GPP TSG RAN WG1 Meeting #87; R1-1700594; Spokane, USA, Jan. 16-20, 2017, pp. 1-4.
"Further studies on benefits and possible specification impacts of nonlinear precoding schemes", 3GPP TSG-RAN WG1 #87; R1-1612838; Reno, Nevada, USA, Nov. 14-18, 2016, pp. 1-8.
"Non-linear Precoding for Downlink Multiuser MIMO", 3GPP TSG RAN WG1 Ad-Hoc Meeting NR; R1-1700053; Spokane, USA, Jan. 16-20, 2017, pp. 1-6.
"Nonlinear Precoding for Interference Mitigation in HetNets", 3GPP TSG RAN WG1 NR Ad-Hoc Meeting; R1-1701086; Spokane, USA, Jan. 16-20, 2017, pp. 1-9.
"Non-linear Precoding for NR", 3GPP TSG RAN WG1 AH_NR Meeting; R1-1700711; Spokane, USA, Jan. 16-20, 2017, pp. 1-4.
"On MU MIMO nonlinear precoding in NR", 3GPP TSG RAN WG1 NR Ad-Hoc Meeting; R1-1701087; Spokane, USA, Jan. 16-20, 2017, pp. 1-8.
"Views on possible specification impacts of nonlinear precoding schemes", 3GPP TSG-RAN WG1 NR AH; R1-1700877; Spokane, WA, USA, Jan. 16-20, 2017, pp. 1-3.
"3GPP TS 38.211 V15.5.0", 3rd Generation Partnership Project; Technical Specification Group Radio Access Network; NR; Physical channels and modulation (Release 15), Mar. 2019, pp. 1-96.
"3GPP TS 38.214 V15.5.0", 3rd Generation Partnership Project; Technical Specification Group Radio Access Network; NR; Physical layer procedures for data (Release 15), Mar. 2019, pp. 1-103.
Caire, Giuseppe, et al., "On the Achievable Throughput of a Multi-Antenna Gaussian Broadcast Channel", IEEE Trans. Inf. Theory, vol. 49, No. 7, Jul. 23, 2001, pp. 1-46.

* cited by examiner

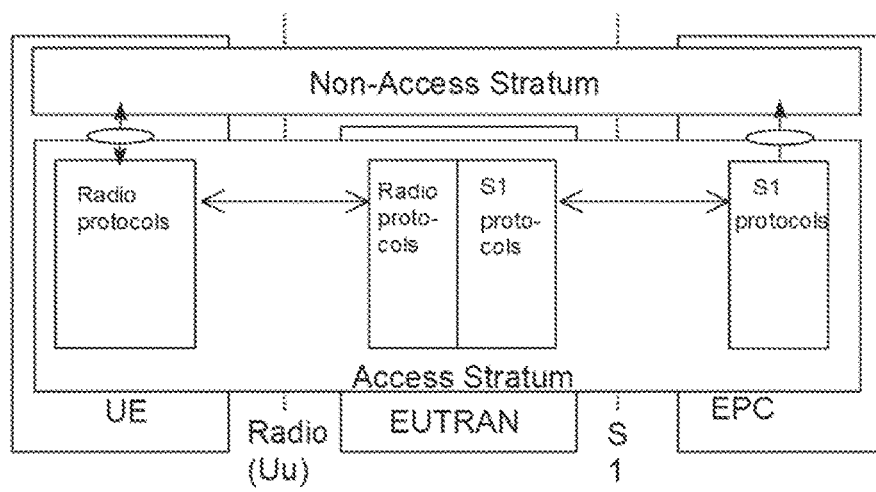
*Fig. 1A* -- PRIOR ART --
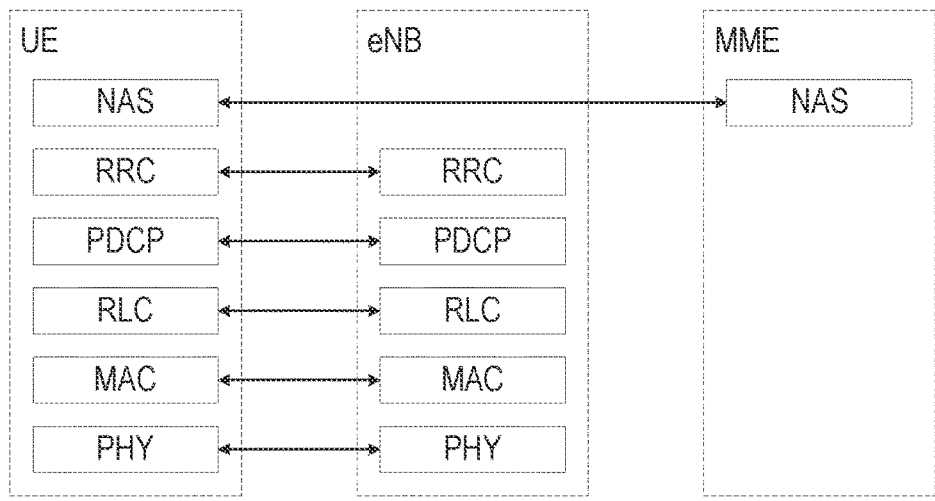
*Fig. 1B* -- PRIOR ART --
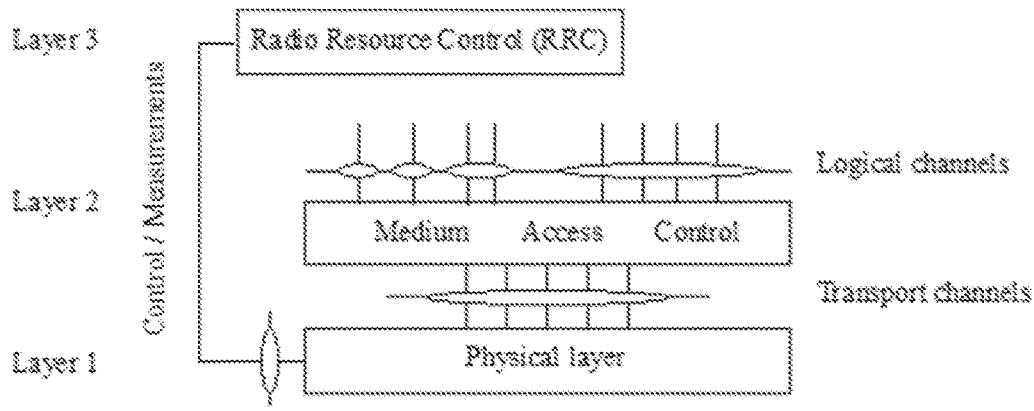
*Fig. 1C* -- PRIOR ART --

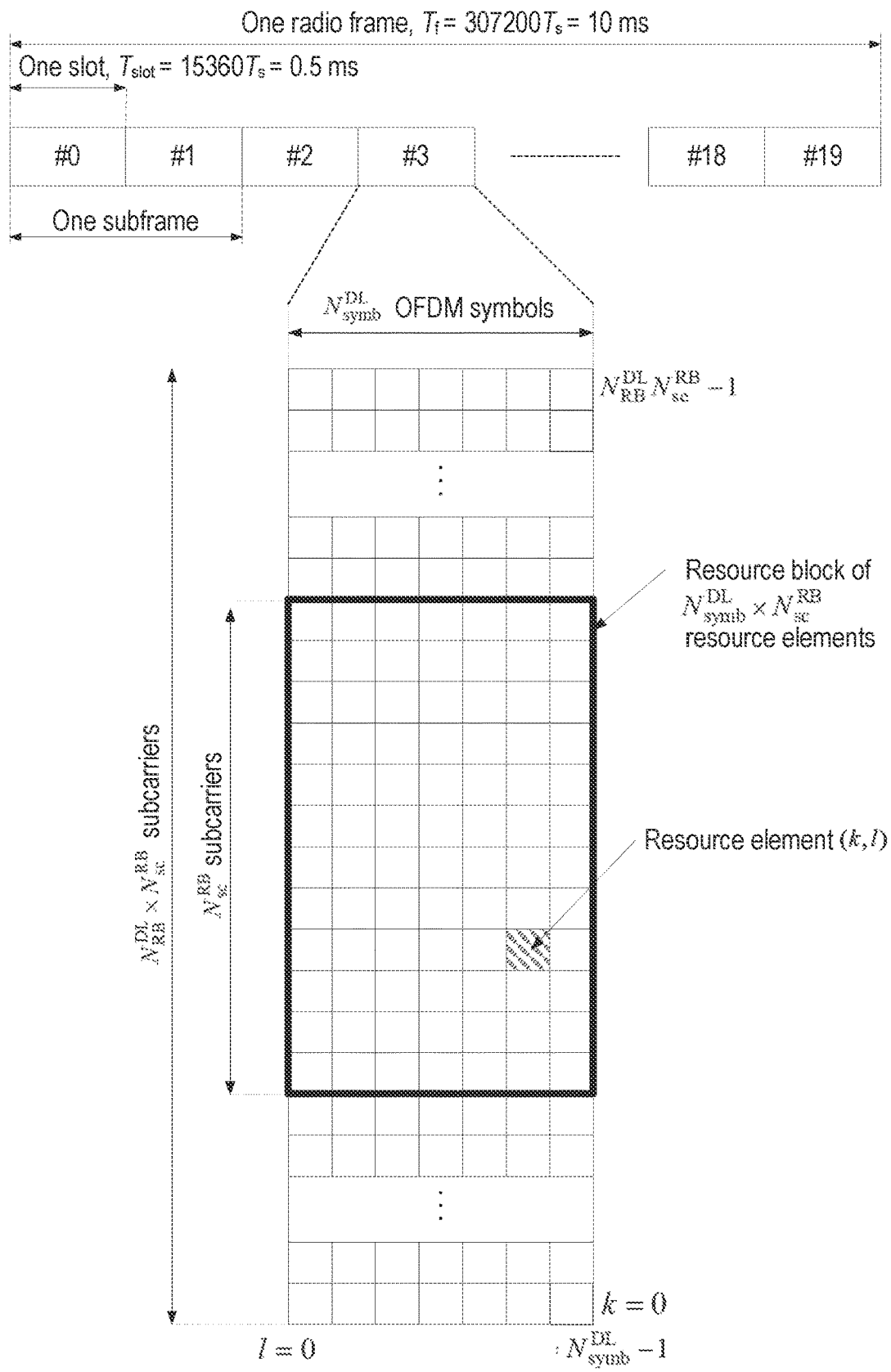
*FIG. 2A*  -- PRIOR ART --

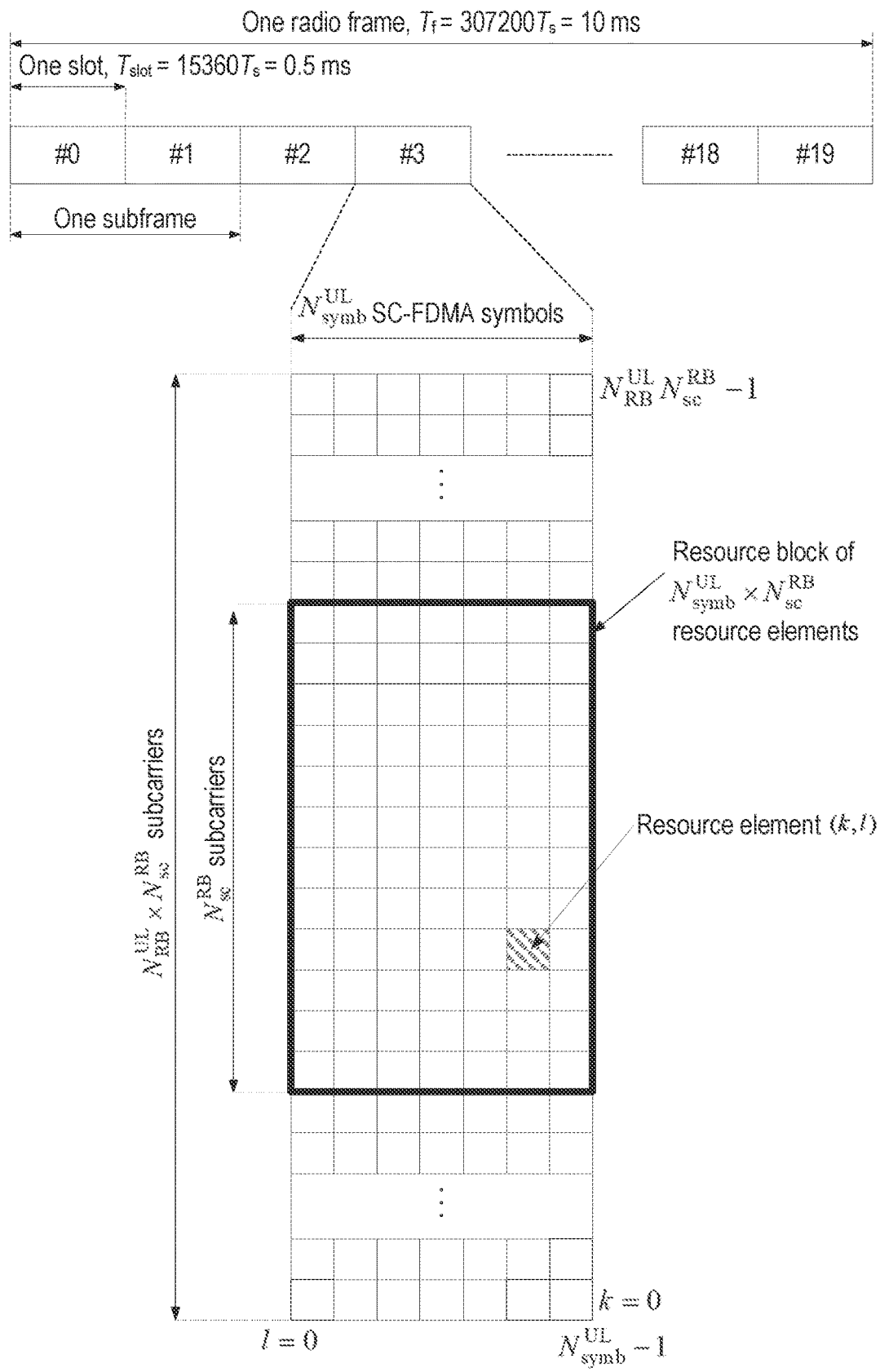
FIG. 2B — PRIOR ART —

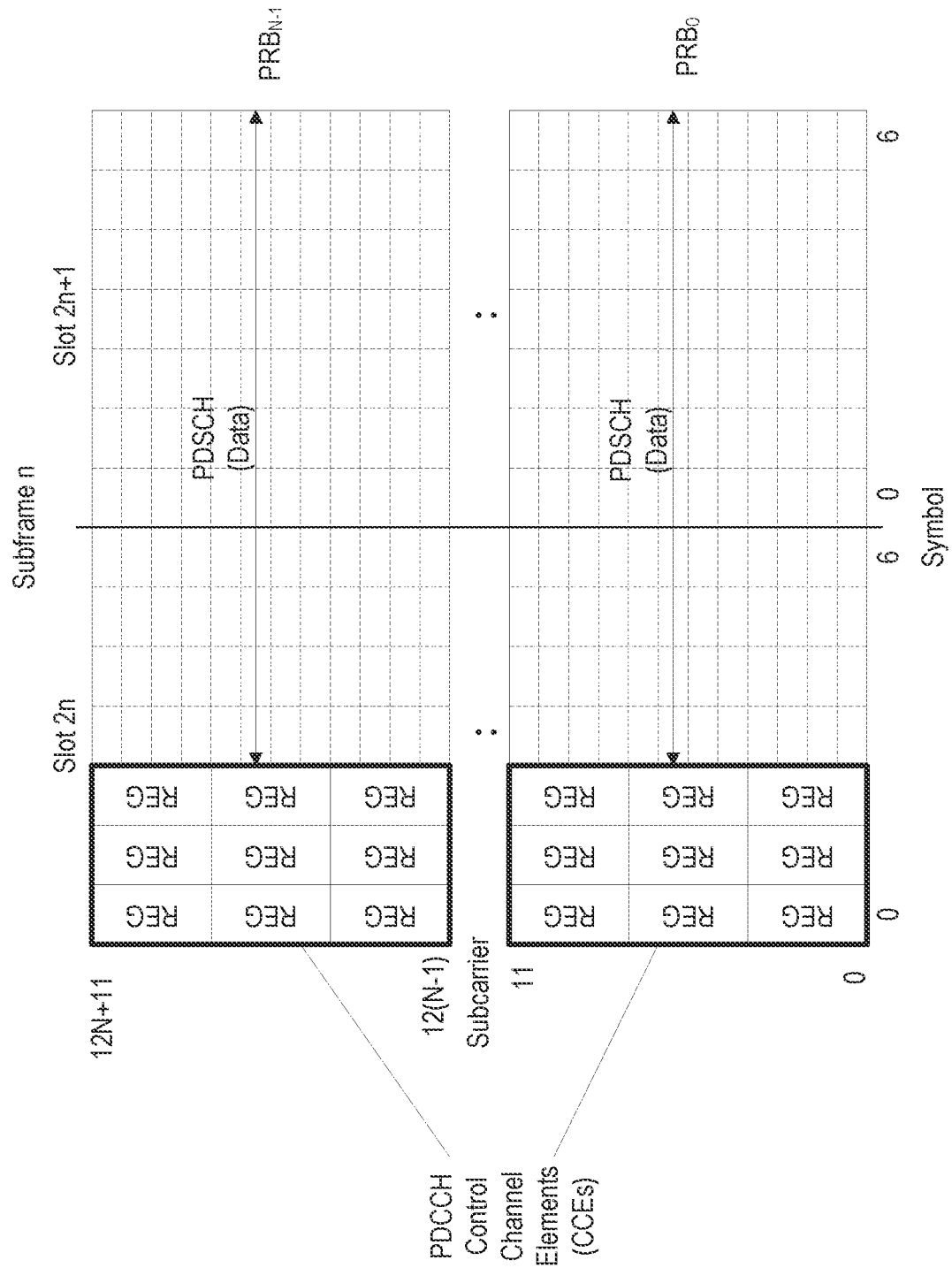
FIG. 3 -- PRIOR ART --

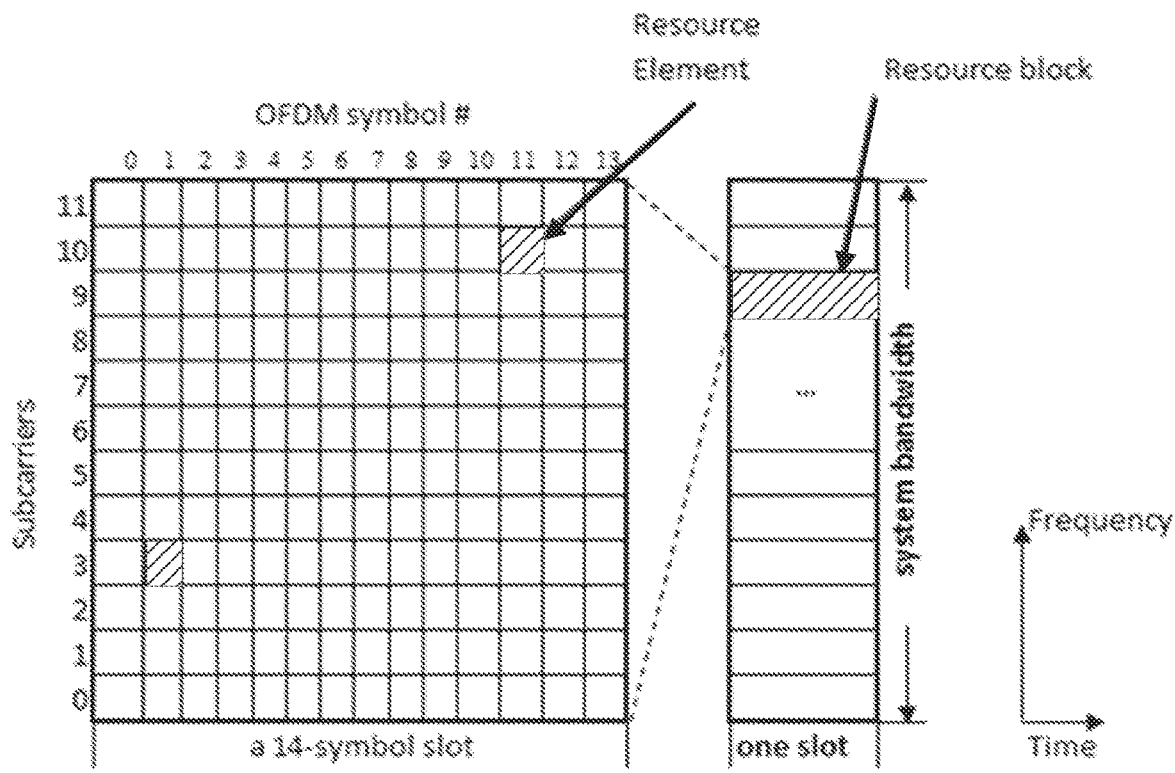
FIG. 4 -- PRIOR ART --
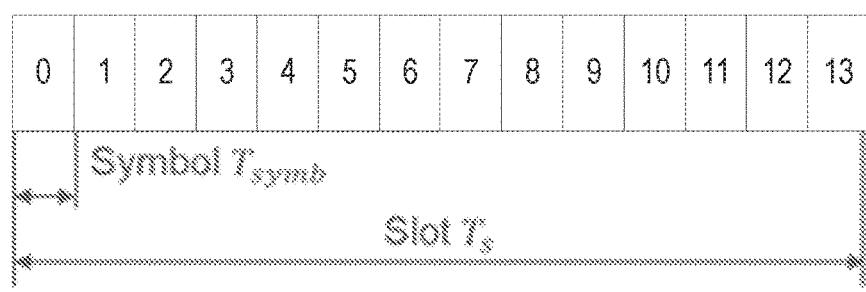
FIG. 5A -- PRIOR ART --
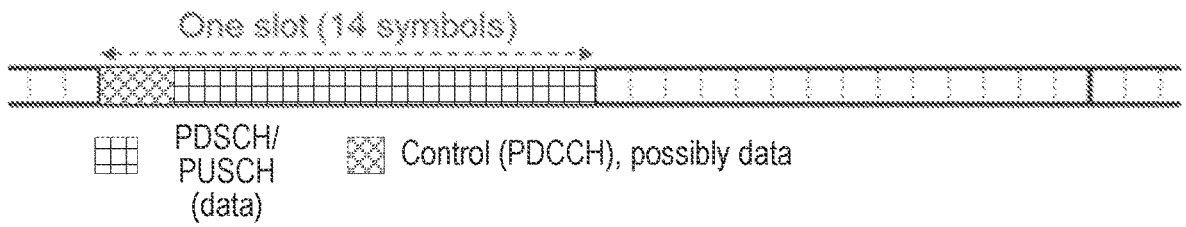
FIG. 5B -- PRIOR ART --

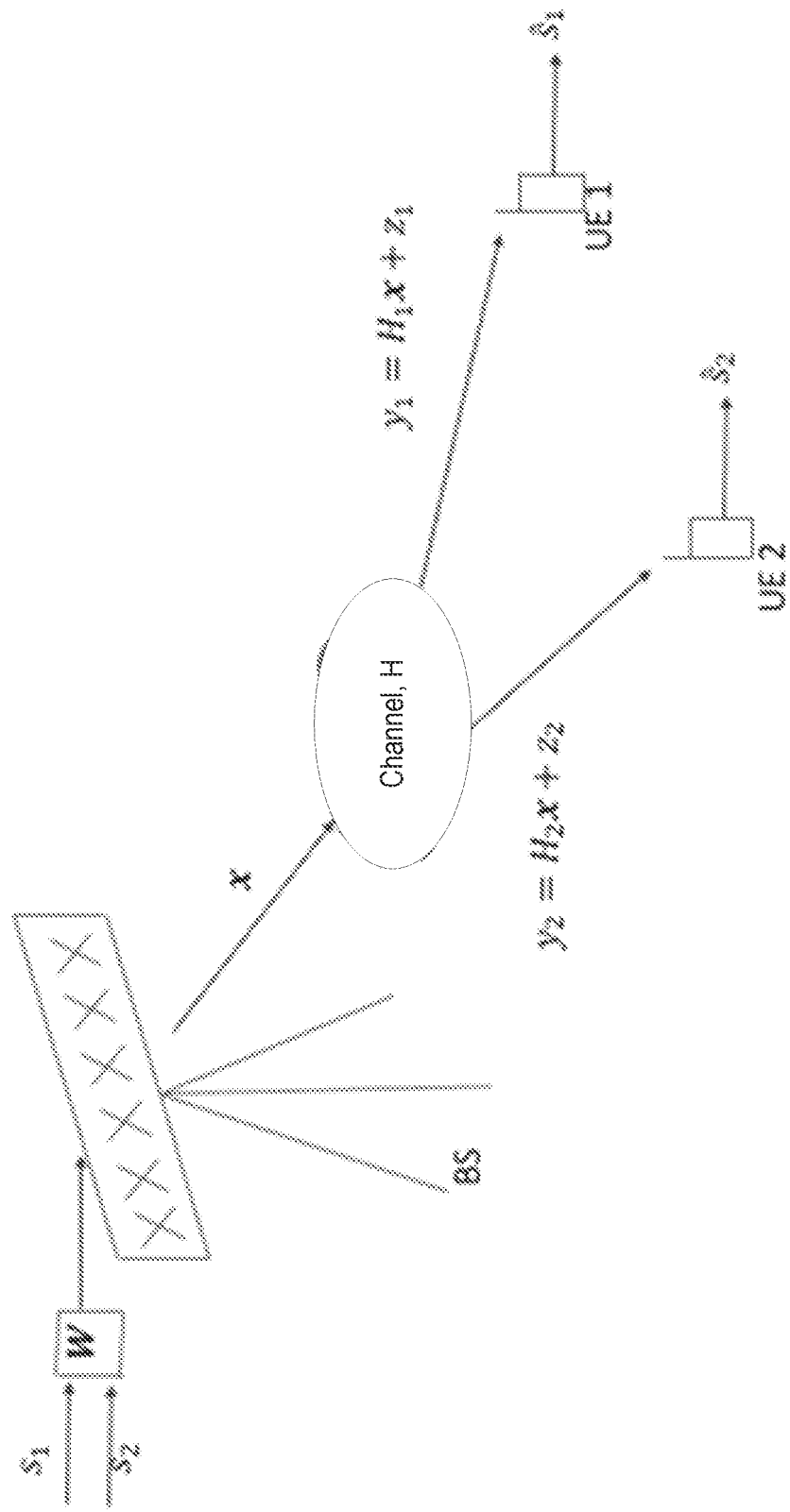
*FIG. 6* -- PRIOR ART --

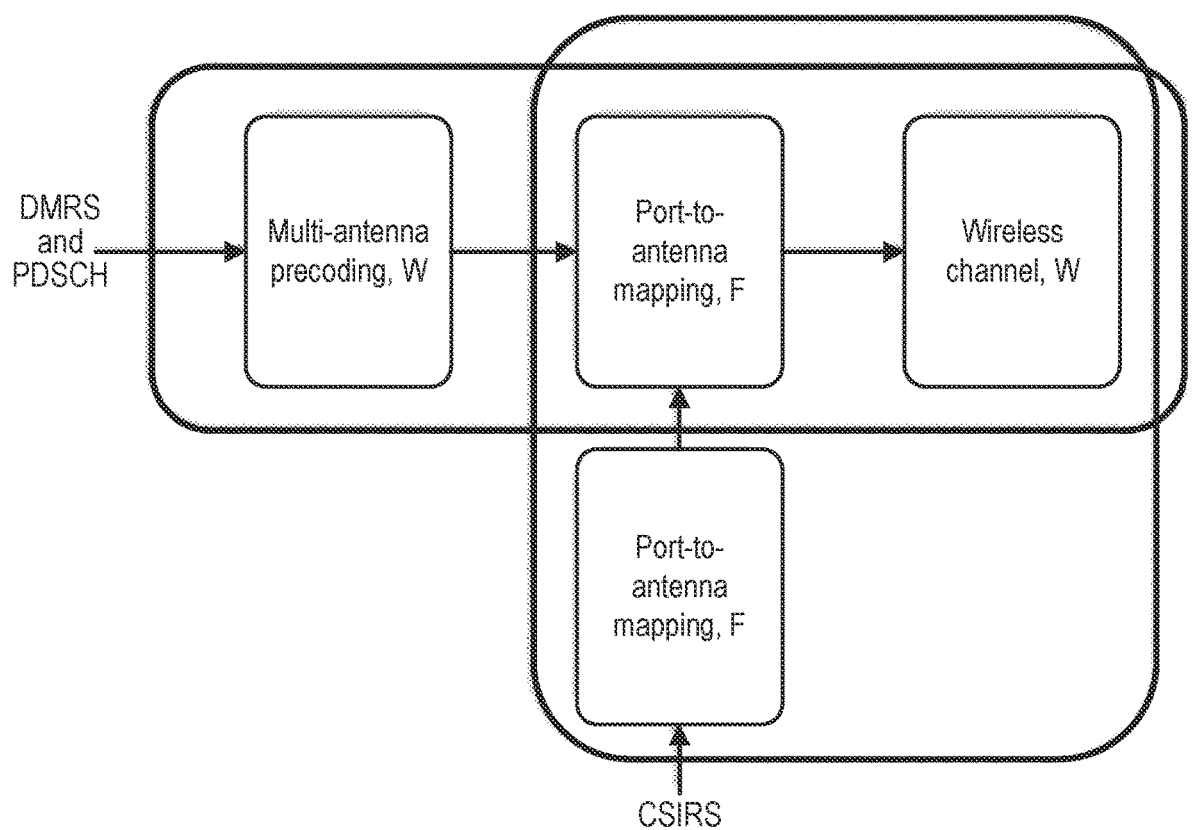
*FIG. 7* -- PRIOR ART --

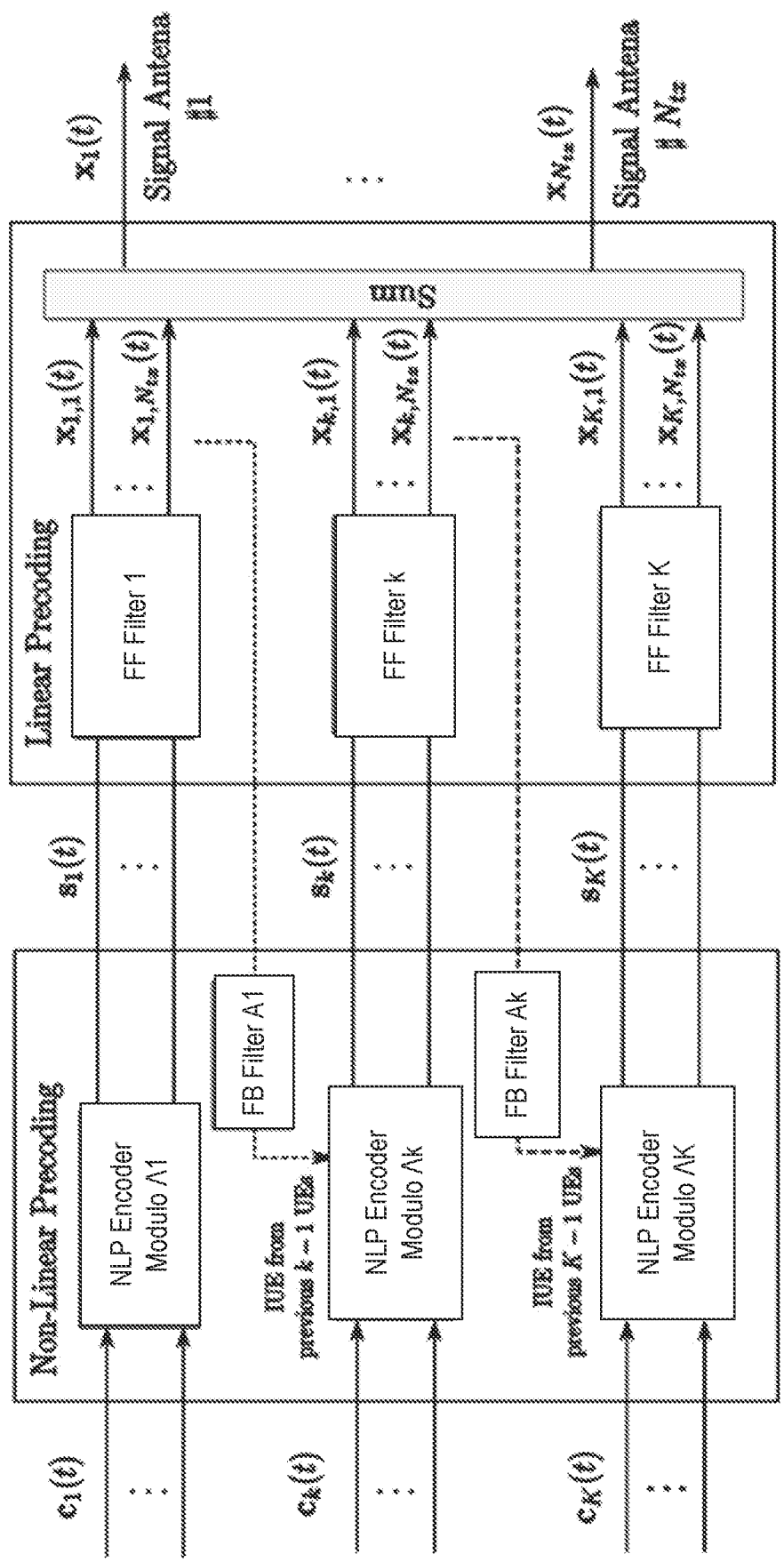
*FIG. 8* -- PRIOR ART --

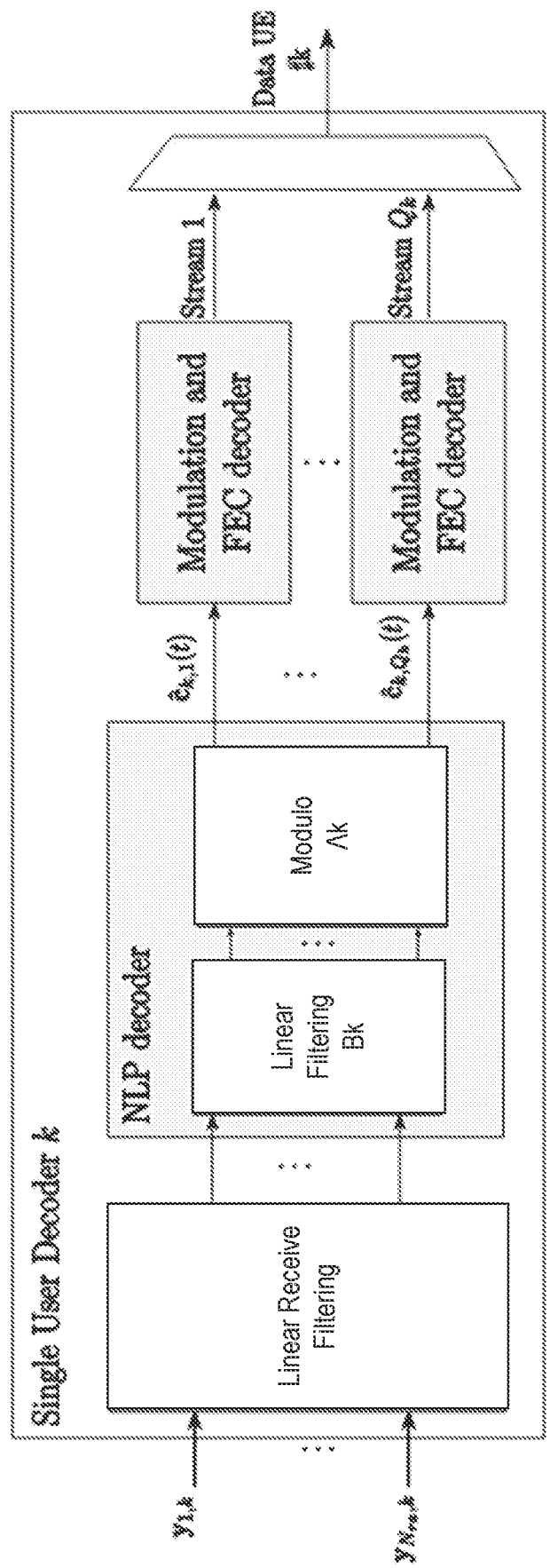
FIG. 9 -- PRIOR ART --

METHODS FOR REFERENCE SIGNAL MAPPING IN NON-LINEAR PRECODING MIMO TRANSMISSION

TECHNICAL FIELD

The present invention generally relates to wireless communication networks, and particularly relates to improvements in the capacity of multi-user downlink (i.e., network to device) transmissions in wireless communication networks.

BACKGROUND

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases. One of the features of Release 11 is an enhanced Physical Downlink Control Channel (ePDCCH), which has the goals of increasing capacity and improving spatial reuse of control channel resources, improving inter-cell interference coordination (ICIC), and supporting antenna beamforming and/or transmit diversity for control channel.

FIG. 1A shows a high-level block diagram of an exemplary LTE architecture in terms of its constituent entities—user equipment (UE), E-UTRAN, and EPC—as well as a high-level functional division into the Access Stratum (AS) and the Non-Access Stratum (NAS). The E-UTRAN is responsible for all radio-related functions in the network, including radio bearer control, radio admission control, radio mobility control, scheduling, and dynamic allocation of resources to UEs in uplink and downlink, as well as security of the communications with the UEs. As used within the 3GPP standards, "user equipment" or "UE" means any wireless communication device (e.g., smartphone, IoT device, computing device, etc.) that is capable of communicating with 3GPP-standard-compliant network equipment, including E-UTRAN as well as UTRAN and/or GERAN, as third-("3G") and second-generation ("2G") 3GPP radio access networks are commonly known. Some UEs can also be capable of communicating with a Next-Generation RAN (NG-RAN), which is discussed in more detail below.

FIG. 1A also illustrates two particular interface points, namely Uu (UE/E-UTRAN Radio Interface) and S1 (E-UTRAN/EPC interface), each using a specific set of protocols, i.e., Radio Protocols and S1 Protocols. Each of the two protocols can be further segmented into user plane (or "U-plane") and control plane (or "C-plane") protocol functionality. On the Uu interface, the U-plane carries user information (e.g., data packets) while the C-plane is carries control information between UE and E-UTRAN.

FIG. 1B illustrates a block diagram of an exemplary C-plane protocol stack on the Uu interface comprising Physical (PHY), Medium Access Control (MAC), Radio Link Control (RLC), Packet Data Convergence Protocol (PDCP), and Radio Resource Control (RRC) layers. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PHY, MAC, and RLC layers perform identical functions for both the U-plane and the C-plane. The PDCP layer provides ciphering/deciphering and integrity protection for both U-plane and C-plane, as well as other functions for the U-plane such as header compression.

FIG. 1C shows a block diagram of an exemplary LTE radio interface protocol architecture from the perspective of the PHY. The interfaces between the various layers are provided by Service Access Points (SAPs), indicated by the ovals in FIG. 1C. The PHY interfaces with MAC and RRC protocol layers described above. The MAC provides different logical channels to the RLC layer (also described above), characterized by the type of information transferred, whereas the PHY provides a transport channel to the MAC, characterized by how the information is transferred over the radio interface. In providing this transport service, the PHY performs various functions including error detection and correction; rate-matching and mapping of the coded transport channel onto physical channels; power weighting, modulation, and demodulation of physical channels; transmit diversity, beamforming, and multiple input multiple output (MIMO) antenna processing; and sending radio measurements to higher layers (e.g., RRC).

Generally speaking, a physical channel corresponds a set of resource elements carrying information that originates from higher layers. Downlink (i.e., eNB to UE) physical channels provided by the LTE PHY include Physical Downlink Shared Channel (PDSCH), Physical Multicast Channel (PMCH), Physical Downlink Control Channel (PDCCH), Relay Physical Downlink Control Channel (R-PDCCH), Physical Broadcast Channel (PBCH), Physical Control Format Indicator Channel (PCFICH), and Physical Hybrid ARQ Indicator Channel (PHICH). In addition, the LTE PHY downlink includes various reference signals, synchronization signals, and discovery signals.

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information (DCI), mainly scheduling decisions, required for reception of PDSCH, and for uplink scheduling grants enabling transmission on PUSCH.

Uplink (i.e., UE to eNB) physical channels provided by the LTE PHY include Physical Uplink Shared Channel (PUSCH), Physical Uplink Control Channel (PUCCH), and Physical Random Access Channel (PRACH). In addition, the LTE PHY uplink includes various reference signals including demodulation reference signals (DM-RS), which are transmitted to aid the eNB in the reception of an associated PUCCH or PUSCH; and sounding reference signals (SRS), which are not associated with any uplink channel. PUSCH is the uplink counterpart to the PDSCH. PUCCH is used by UEs to transmit uplink control information, including HARQ acknowledgements, channel state information reports, etc. PRACH is used for random access preamble transmission.

The multiple access scheme for the LTE PHY is based on Orthogonal Frequency Division Multiplexing (OFDM) with a cyclic prefix (CP) in the downlink, and on Single-Carrier Frequency Division Multiple Access (SC-FDMA) with a cyclic prefix in the uplink. To support transmission in paired and unpaired spectrum, the LTE PHY supports both Frequency Division Duplexing (FDD) (including both full- and half-duplex operation) and Time Division Duplexing (TDD). FIG. 2A shows an exemplary radio frame structure ("type 1") used for LTE FDD downlink (DL) operation. The DL radio frame has a fixed duration of 10 ms and consists of 20 slots, labeled 0 through 19, each with a fixed duration of 0.5 ms. A 1-ms subframe comprises two consecutive slots where subframe i consists of slots 2i and 2i+1. Each exemplary FDD DL slot consists of $N^{DL}_{symb}$ OFDM symbols, each of which is comprised of $N_{sc}$ OFDM subcarriers. Exemplary values of $N^{DL}_{symb}$ can be 7 (with a normal CP) or 6 (with an extended-length CP) for subcarrier spacing (SCS) of 15 kHz. The value of $N_{sc}$ is configurable based upon the available channel bandwidth. Since persons of ordinary skill in the art are familiar with the principles of OFDM, further details are omitted in this description.

As shown in FIG. 2A, a combination of a particular subcarrier in a particular symbol is known as a resource element (RE). Each RE is used to transmit a particular number of bits, depending on the type of modulation and/or bit-mapping constellation used for that RE. For example, some REs may carry two bits using QPSK modulation, while other REs may carry four or six bits using 16- or 64-QAM, respectively. The radio resources of the LTE PHY are also defined in terms of physical resource blocks (PRBs). A PRB spans $N^{RB}_{sc}$ sub-carriers over the duration of a slot (i.e., $N^{DL}_{symb}$ symbols), where $N^{RB}_{sc}$ is typically either 12 (with a 15-kHz sub-carrier bandwidth) or 24 (7.5-kHz bandwidth). A PRB spanning the same $N^{RB}_{sc}$ subcarriers during an entire subframe (i.e., $2N^{DL}_{symb}$ symbols) is known as a PRB pair. Accordingly, the resources available in a subframe of the LTE PHY DL comprise $N^{DL}_{RB}$ PRB pairs, each of which comprises $2N^{DL}_{symb} \cdot N^{RB}_{sc}$ REs. For a normal CP and 15-KHz SCS, a PRB pair comprises 168 REs.

One exemplary characteristic of PRBs is that consecutively numbered PRBs (e.g., $PRB_i$ and $PRB_{i+1}$) comprise consecutive blocks of subcarriers. For example, with a normal CP and 15-KHz sub-carrier bandwidth, $PRB_0$ comprises sub-carrier 0 through 11 while $PRB_1$ comprises sub-carriers 12 through 23. The LTE PHY resource also can be defined in terms of virtual resource blocks (VRBs), which are the same size as PRBs but may be of either a localized or a distributed type. Localized VRBs can be mapped directly to PRBs such that VRB $n_{VRB}$ corresponds to PRB $n_{PRB}=n_{VRB}$. On the other hand, distributed VRBs may be mapped to non-consecutive PRBs according to various rules, as described in 3GPP TS 36.213 or otherwise known to persons of ordinary skill in the art. However, the term "PRB" shall be used in this disclosure to refer to both physical and virtual resource blocks. Moreover, the term "PRB" will be used henceforth to refer to a resource block for the duration of a subframe, i.e., a PRB pair, unless otherwise specified.

FIG. 2B shows an exemplary LTE FDD uplink (UL) radio frame configured in a similar manner as the exemplary FDD DL radio frame shown in FIG. 2A. Using terminology consistent with the above DL description, each UL slot consists of $N^{UL}_{symb}$ OFDM symbols, each of which is comprised of $N_{sc}$ OFDM subcarriers.

As discussed above, the LTE PHY maps the various DL and UL physical channels to the resources shown in FIGS. 2A and @B, respectively. For example, the PHICH carries HARQ feedback (e.g., ACK/NAK) for UL transmissions by the UEs. Similarly, PDCCH carries scheduling assignments, channel quality feedback (e.g., CSI) for the UL channel, and other control information. Likewise, a PUCCH carries uplink control information such as scheduling requests, CSI for the downlink channel, HARQ feedback for eNB DL transmissions, and other control information. Both PDCCH and PUCCH can be transmitted on aggregations of one or several consecutive control channel elements (CCEs), and a CCE is mapped to the physical resource based on resource element groups (REGs), each of which is comprised of a plurality of REs. For example, a CCE can comprise nine (9) REGs, each of which can comprise four (4) REs.

FIG. 3 illustrates one exemplary manner in which the CCEs and REGs can be mapped to the physical resource, i.e., PRBs. As shown in FIG. 3, the REGs comprising the CCEs of the PDCCH can be mapped into the first three symbols (e.g., CFI=3) of a subframe, whereas the remaining symbols are available for other physical channels, such as the PDSCH which carries user data. In Release-8 configurations, one such portion of the DL transmission is referred to as a Transmit Time Interval (TTI). Each of the REGs comprises four REs, which are represented by the small, dashed-line rectangles. Since QPSK modulation is used for the PDCCH, in the exemplary configuration of FIG. 3, each REG comprises eight (8) bits and each CCE comprises 72 bits. Although two CCEs are shown in FIG. 3, the number of CCEs may vary depending on the required PDCCH capacity, determined by number of users, amount of measurements and/or control signaling, etc. Moreover, other ways of mapping REGs to CCEs will be apparent to those of ordinary skill in the art. On the uplink, PUCCH can be configured similarly, except that the number of bits per CCE varies because PUCCH uses either QPSK or BPSK depending on particular message contents.

Within the LTE DL, certain REs within each LTE subframe are reserved for the transmission of reference signals, such as DM-RS mentioned above. For example, DM-RS can be carried in OFDM symbols 6-7 and 13-14 of the OFDM subframe, with the respective DM-RS REs distributed in the frequency domain within each of those symbols. In addition, the DM-RS REs are divided into two code division multiplexing (CDM) groups referred to as CDM Groups 1 and 2. In LTE systems supporting transmission ranks 1-4, both CDM groups are used in combination with length-2 orthogonal cover codes OCCs. The OCCs are applied to clusters of two adjacent (i.e., in time domain) reference symbols in the same subcarrier in the frequency domain.

In LTE, UE transmissions are dynamically scheduled. In each slot, the base station (e.g., eNB) transmits downlink control information (DCI) over PDCCH that indicates which UE is scheduled to receive data in that slot, which RBs will carry that data (a so-called "DL assignment"). A UE first detects and decodes DCI and, if successful, then decodes the corresponding PDSCH based on the decoded DCI Likewise, DCI can include UL grants that indicate which UE is scheduled to transmit data in that slot, which RBs will carry that data. This control signaling is typically transmitted in the first n OFDM symbols in each subframe. The number n (=1, 2, 3 or 4) is known as the Control Format Indicator (CFI) and is indicated by the PCFICH transmitted in the first symbol of the control region.

While LTE was primarily designed for user-to-user communications, 5G (also referred to as "NR") cellular networks are envisioned to support both high single-user data rates (e.g., 1 Gb/s) and large-scale, machine-to-machine communication involving short, bursty transmissions from many different devices that share the frequency bandwidth. The 5G radio standards (also referred to as "New Radio" or "NR") are currently targeting a wide range of data services including eMBB (enhanced Mobile Broad Band), URLLC (Ultra-Reliable Low Latency Communication), and Machine-Type Communications (MTC). These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher. In contrast, URLLC requires low latency and high reliability but with less strict data rate requirements.

Similar to LTE, NR uses CP-OFDM (Cyclic Prefix Orthogonal Frequency Division Multiplexing) in the downlink and both CP-OFDM and DFT-spread OFDM (DFT-S-OFDM) in the uplink. In the time domain, NR downlink and uplink physical resources are organized into equally-sized subframes of 1 ms each. A subframe is further divided into multiple slots of equal duration, with each slot including multiple OFDM-based symbols.

In Rel-15 NR, a UE can be configured with up to four carrier bandwidth parts (BWPs) in the downlink with a single downlink carrier BWP being active at a given time. A UE can be configured with up to four carrier BWPs in the uplink with a single uplink carrier BWP being active at a given time. If a UE is configured with a supplementary uplink, the UE can be configured with up to four additional carrier BWPs in the supplementary uplink, with a single supplementary uplink carrier BWP being active at a given time.

FIG. 4 shows an exemplary time-frequency resource grid for an NR slot. As illustrated in FIG. 4, a resource block (RB) consists of a group of 12 contiguous OFDM subcarriers for a duration of a 14-symbol slot Like in LTE, a resource element (RE) consists of one subcarrier in one slot. Common RBs (CRBs) are numbered from 0 to the end of the system bandwidth. Each BWP configured for a UE has a common reference of CRB 0, such that a particular configured BWP may start at a CRB greater than zero. In this manner, a UE can be configured with a narrow BWP (e.g., 10 MHz) and a wide BWP (e.g., 100 MHz), each starting at a particular CRB, but only one BWP can be active for the UE at a given point in time.

Within a BWP, RBs are defined and numbered in the frequency domain from 0 to $N_{BWP,i}^{size}-1$, where i is the index of the particular BWP for the carrier. Similar to LTE, each NR resource element (RE) corresponds to one OFDM subcarrier during one OFDM symbol interval. Various SCS values (referred to as numerologies) are supported in NR and are given by $\Delta f=(15\times2^{\alpha})$ kHz where $\alpha\in(0, 1, 2, 3, 4)$. $\Delta f=15$ kHz is the basic (or reference) subcarrier spacing that is also used in LTE. The slot length is inversely related to subcarrier spacing or numerology according to $\frac{1}{2}^{\alpha}$ ms. For example, there is one (1-ms) slot per subframe for $\Delta f=15$ kHz, two 0.5-ms slots per subframe for $\Delta f=30$ kHz, etc. In addition, the RB bandwidth is directly related to numerology according to $2^{\alpha}*180$ kHz.

Table 1 below summarizes the supported NR transmission numerologies and associated parameters. Different DL and UL numerologies can be configured by the network.

TABLE 1

| $\mu$ | $\Delta f = 2^{\mu} \cdot 15$ [kHz] | Cyclic prefix | Slot length | RB BW (MHz) |
|---|---|---|---|---|
| 0 | 15 | Normal | 1 ms | 0.18 |
| 1 | 30 | Normal | 0.5 ms | 0.36 |
| 2 | 60 | Normal, Extended | 0.25 ms | 0.72 |
| 3 | 120 | Normal | 125 µs | 1.44 |
| 4 | 240 | Normal | 62.5 µs | 2.88 |

An NR slot can include 7 or 14 symbols for $\Delta f \leq 60$ kHz, and 14 symbols for $\Delta f > 60$ kHz. FIG. 5A shows an exemplary NR slot configuration comprising 14 OFDM symbols, where the slot and symbols durations are denoted $T_s$ and $T_{symb}$, respectively. In addition, NR includes a Type-B scheduling, also known as "mini-slots." These are shorter than slots, typically ranging from one symbol up to one less than the number of symbols in a slot (e.g., 6 or 13), and can start at any symbol of a slot. Mini-slots can be used if the transmission duration of a slot is too long and/or the occurrence of the next slot start (slot alignment) is too late. Applications of mini-slots include unlicensed spectrum and latency-critical transmission (e.g., URLLC). However, mini-slots are not service-specific and can also be used for eMBB or other services.

Similar to LTE, NR data scheduling is done on a per-slot basis. In each slot, the base station (e.g., gNB) transmits downlink control information (DCI) over PDCCH that indicates which UE is scheduled to receive data in that slot, which RBs will carry that data. A UE first detects and decodes DCI and, if successful, then decodes the corresponding PDSCH based on the decoded DCI. Likewise, DCI can include UL grants that indicate which UE is scheduled to transmit data in that slot, which RBs will carry that data. A UE first detects and decodes an uplink grant from PDCCH and, if successful, then transmits the corresponding PUSCH on the resources indicated by the grant. DCI formats 0_0 and 0_1 are used to convey UL grants for PUSCH, while DCI formats 1_0 and 1_1 are used to convey PDSCH scheduling. Other DCI formats (2_0, 2_1, 2_2 and 2_3) are used for other purposes including transmission of slot format information, reserved resource, transmit power control information, etc. In addition to grants or assignments, DCI can also carry an indication of modulation and coding scheme (MCS) to be used for DL or UL transmissions.

FIG. 5B shows an exemplary NR slot structure with 15-kHz subcarrier spacing. Within an NR slot, the PDCCH channels are confined to a particular number of symbols and a particular number of subcarriers, where this region is referred to as the control resource set (CORESET). In the exemplary structure shown in FIG. 5B, the first two symbols contain PDCCH and each of the remaining 12 symbols contains physical data channels (PDCH), i.e., either PDSCH or PUSCH. Depending on the particular CORESET configuration, however, the first two slots can also carry PDSCH or other information, as required.

A CORESET is made up of multiple RBs (i.e., multiples of 12 REs) in the frequency domain and either one, two, or three OFDM symbols in the time domain, as further defined in 3GPP TS 38.211 § 7.3.2.2. A CORESET is functionally similar to the control region in LTE subframe, such as illustrated in FIG. 3. In NR, however, each REG consists of all 12 REs of one OFDM symbol in a RB, whereas an LTE REG includes only four REs, as illustrated in FIG. 4. Like in LTE, the CORESET time domain size can be indicated by PCFICH. In LTE, the frequency bandwidth of the control region is fixed (i.e., to the total system bandwidth), whereas in NR, the frequency bandwidth of the CORESET is variable. CORESET resources can be indicated to a UE by RRC signaling.

The smallest unit used for defining CORESET is the REG, which spans one PRB in frequency and one OFDM symbol in time. In addition to PDCCH, each REG contains demodulation reference signals (DM-RS) to aid in the estimation of the radio channel over which that REG was transmitted. When transmitting the PDCCH, a precoder can be used to apply weights at the transmit antennas based on some knowledge of the radio channel prior to transmission. It is possible to improve channel estimation performance at the UE by estimating the channel over multiple REGs that are proximate in time and frequency, so long as the same precoder used for the REGs by the transmitter. To assist the UE with channel estimation, the multiple REGs can be grouped together to form a REG bundle, and the REG bundle size for a CORESET can be indicated to the UE. The UE can assume that any precoder used for the transmission of the PDCCH is the same for all the REGs in the REG bundle. A REG bundle may consist of 2, 3, or 6 REGs.

An NR control channel element (CCE) consists of six REGs. These REGs may either be contiguous or distributed in frequency. When the REGs are distributed in frequency, the CORESET is said to use interleaved mapping of REGs to a CCE, while if the REGs are contiguous in frequency, a non-interleaved mapping is said to be used. Interleaving can provide frequency diversity. Not using interleaving is beneficial for cases where knowledge of the channel allows the use of a precoder in a particular part of the spectrum improve the SINR at the receiver.

5G/NR systems are expected to operate at higher frequencies (e.g., millimeter-wavelength or "mmW") such as 5-300 GHz. 5G/NR systems are also expected to utilize a variety of multi-antenna technology (e.g., antenna arrays) at the transmitter, the receiver, or both. In the field of wireless communications, multi-antenna technology can comprise a plurality of antennas in combination with advanced signal processing techniques (e.g., beamforming). Multi-antenna technology can be used to improve various aspects of a communication system, including system capacity (e.g., more users per unit bandwidth per unit area), coverage (e.g., larger area for given bandwidth and number of users), and increased per-user data rate (e.g., in a given bandwidth and area). Directional antennas can also ensure better wireless links as a mobile or fixed device experiences a time-varying channel.

The availability of multiple antennas at the transmitter and/or the receiver can be utilized in different ways to achieve different goals. For example, multiple antennas at the transmitter and/or the receiver can be used to provide additional diversity against radio channel fading. To achieve such diversity, the channels experienced by the different antennas should have low mutual correlation, e.g., a sufficiently large antenna spacing ("spatial diversity") and/or different polarization directions ("polarization diversity"). Historically, the most common multi-antenna configuration has been the use of multiple antennas at the receiver side, which is commonly referred to as "receive diversity." Alternately and/or in addition, multiple antennas can be used in the transmitter to achieve transmit diversity. A multi-antenna transmitter can achieve diversity even without any knowledge of the channels between the transmitter and the receiver, so long as there is low mutual correlation between the channels of the different transmit antennas.

In many wireless communication systems, there can be fewer constraints on the complexity of the base station (e.g., eNB or gNB) compared to the UE (also referred to herein as wireless device). For example, if $N_{TX}$ is the number of base station antenna elements and $N_{RX}$ is the number of UE antenna elements, typical values for $N_{TX}$ are 8, 16, and 32, while typical values for $N_{RX}$ are 1 and 2. As such, transmit diversity may be feasible in the DL only and, in fact, may provide a way to simplify the receiver in the terminal. In the UL, due to the complexity of multiple transmit antennas, it may be preferable to achieve diversity by using a single transmit antenna in the UE and multiple receive antennas at the base station. Nevertheless, it is expected that in 5G systems, certain operating configurations will utilize multiple antennas at both UE and base station.

In other exemplary configurations, multiple antennas at the transmitter and/or the receiver can be used to shape or "form" the overall antenna beam (e.g., transmit and/or receive beam, respectively) in a certain way, with the general goal being to improve the received signal-to-interference-plus-noise ratio (SINR) and, ultimately, system capacity and/or coverage. This can be done, for example, by maximizing the overall antenna gain in the direction of the target receiver or transmitter and/or by reducing the gain in the direction(s) of dominant interfering signal(s). In general, beamforming can increase the signal strength at the receiver in proportion to the number of transmit antennas. Beamforming can be based either on high or low mutual correlation between the antennas. High mutual antenna correlation can typically result from a small distance between antennas in an array. In such exemplary conditions, beamforming can boost the received signal strength but does not provide any diversity against radio-channel fading. On the other hand, low mutual antenna correlation typically can result from either a sufficiently large inter-antenna spacing or different polarization directions in the array. If some knowledge of the downlink channels of the different transmit antennas (e.g., the relative channel phases) is available at the transmitter, multiple transmit antennas with low mutual correlation can both provide diversity, and also shape the antenna beam in the direction of the target receiver and/or transmitter.

In other exemplary configurations, multiple antennas at both the transmitter and the receiver can further improve the SINR and/or achieve an additional diversity against fading compared to only multiple receive antennas or multiple transmit antennas. This can be useful in relatively poor channels that are limited, for example, by interference and/or noise (e.g., high user load or near cell edge). In relatively good channel conditions, however, the capacity of the channel becomes saturated such that further improving the SINR provides limited increases in capacity. In such cases, using multiple antennas at both the transmitter and the receiver can be used to create multiple parallel communication "channels" or "layers" over the radio interface. This can facilitate a highly efficient utilization of both the available transmit power and the available bandwidth resulting in, e.g., very high data rates within a limited bandwidth without a disproportionate degradation in coverage. For example, under certain exemplary conditions, the channel capacity can increase linearly with the number of antennas and avoid saturation in the data capacity and/or rates. These techniques are commonly referred to as "spatial multiplexing" or multiple-input, multiple-output (MIMO) antenna processing.

Spatial multiplexing can be utilized in various ways. For example, single-user MIMO (SU-MIMO) involves spatially multiplex two-or-more layers to a single UE. Alternately, multi-user MIMO (MU-MIMO) involves spatially multiplex two-or-more layers to two or more UEs, with each UE receiving one or more layers. In either case, however, a base station transmitter must employ some type of MIMO precoding to be able to utilize its antenna arrays to achieve these performance gains. The base station can derive the precoding based on knowledge of the channel from each transmit antenna to each UE receive antenna.

For example, this can be done by the receiver (e.g., UE) measuring the amplitude and phase of a known transmitted data symbol (e.g., a reference signal) and sending these measurements to the transmitter (e.g., base station) as "channel state information" (CSI). CSI can include, for example, amplitude and/or phase of the channel at one or more frequencies, amplitude and/or phase of time-domain multipath components of the signal via the channel, direction of arrival of multipath components of the signal via the channel, and other direct channel measurements known by persons of ordinary skill. Alternately, or in addition, CSI can include a set of transmission parameters recommended for the channel based on one or more channel measurements.

The known reference signals used to estimate CSI are transmitted in association with the spatially multiplexed data. As such, RS measurements provide an accurate assessment of the channel used to transmit the spatially multiplexed data symbols. 3GPP specifications define "antenna ports" used to transmit the spatially multiplexed data with respect to a RS of the corresponding transmission. Various RS include CSI-RS, DM-RS, and phase-tracking RS (PT-RS). More specifically, an antenna port is defined such that the channel over which a symbol on the antenna port is conveyed can be inferred from the channel over which another symbol (e.g., a RS) on the same antenna port is conveyed.

3GPP Rel-15 only specifies linear precoding schemes. However, there is strong interest within 3GPP to specify non-linear precoding (NLP) in upcoming releases, particularly for MU-MIMO precoding, due to NLP's significantly better signal orthogonalization for heavily loaded cells. As explained above, it is desirable that the data symbols and the associated RS (e.g., DM-RS, PT-RS, etc.) undergo the same precoding to facilitate the equivalent channel estimation at the receiver. However, certain operations of non-linear precoding schemes can make these RS ambiguous to the receiver, thereby inhibiting the receiver's ability to determine CSI and/or estimate the channel between the transmitter and receiver. This can greatly reduce the effectiveness of non-linear precoding in actual deployments.

SUMMARY

Embodiments of the present disclosure provide specific improvements to communication between user equipment (UE) and network nodes in a wireless communication network, such as by facilitating solutions to overcome the exemplary problems described above.

Some exemplary embodiments of the present disclosure include methods and/or procedures for operating a network node in a wireless network. The exemplary methods and/or procedures can be performed by a network node (e.g., base station, eNB, gNB, ng-eNB, en-gNB, etc., or component thereof) of the wireless network (e.g., E-UTRAN, NG-RAN, etc.), in communication with the one or more user equipment (e.g., UE, wireless device, IoT device, modem, etc. or component thereof).

The exemplary methods and/or procedures can include applying non-linear precoding to a first data stream to remove a representation of expected inter-stream interference due to a second data stream, thereby generating a corrected first data stream. In some embodiments, the non-linear precoding can include Tomlinson-Harashima precoding. In some embodiments, the first and second data streams can be associated with respective first and second users. In some embodiments, the non-linear precoding can also be applied to a second RS stream to generate a corrected second RS stream.

The exemplary methods and/or procedures can also include apply linear precoding to the corrected first data stream and to a first RS stream to generate a first signal layer. Note, however, that the first RS stream is not corrected for the expected inter-stream interference prior to applying the linear precoding. In some embodiments, the first RS stream can include first CSI-RS, that are configured to facilitate same-user channel measurements by the UE. In some embodiments, the linear precoding can also be applied to the corrected second RS stream to generate the first signal layer. Put a different way, the linear precoding can be applied to a multiplexed combination of the corrected first data stream, the corrected second RS stream, and the first RS stream to generate the first signal layer. The exemplary methods and/or procedures can also include transmitting the first signal layer to a UE.

Other exemplary embodiments of the present disclosure include methods and/or procedures for operating a user equipment in a wireless network. The exemplary methods and/or procedures can be performed by a user equipment (UE, e.g., wireless device, IoT device, modem, etc. or component thereof) in communication with a network node (e.g., base station, eNB, gNB, ng-eNB, en-gNB, etc., or component thereof) in the wireless network (e.g., E-UTRAN, NG-RAN, etc.).

The exemplary methods and/or procedures can include receiving a first signal layer transmitted by a network node. The first signal layer can include a first data stream and a first RS stream. In some embodiments, the first signal layer can also include a second RS stream.

In some embodiments, the exemplary methods and/or procedures can also include applying linear filtering to the received first signal layer to generate the first data stream and the first RS stream. In embodiments where the first signal layer also includes the second RS stream, the linear filtering can also be applied to generate the second RS stream.

The exemplary methods and/or procedures can also include performing a modulo operation on the first data stream to generate a corrected first data stream. In some embodiments, the modulo operation can also be performed on the second RS stream to generate a corrected second RS stream. In some embodiments, the exemplary methods and/or procedures can also include demodulating the data symbols comprising the corrected first data stream.

The exemplary methods and/or procedures can also include performing one or more first measurements based on the first RS stream. Note, however, that the first RS stream is not subject to the modulo operation prior to performing the first measurements. In various embodiments, the first measurements can be same-user channel measurements, which can be based on any of DM-RS, PT-RS, and CSI-RS comprising the first RS stream.

In some embodiments, the exemplary methods and/or procedures can also include performing one or more second measurements based on the corrected second RS stream. In contrast to the first RS stream, however, the corrected second RS has been subject to the modulo operation prior to performing the second measurements. In various embodiments, the second measurements can be inter-user interference measurements, which can be based on CSI-RS comprising the first RS stream.

Other exemplary embodiments include network nodes (e.g., base station, eNB, gNB, ng-eNB, en-gNB, etc., or component thereof) or user equipment (UE, e.g., wireless device, IoT device, modem, etc. or component thereof) configured to perform operations corresponding to exemplary methods and/or procedures described herein. Other exemplary embodiments include non-transitory, computer-readable media storing program instructions that, when executed by at least one processor, configure such network nodes or such UEs to perform operations corresponding to exemplary methods and/or procedures described herein.

These and other objects, features and advantages of the exemplary embodiments of the present disclosure will become apparent upon reading the following detailed description of the exemplary embodiments of the present disclosure.

BRIEF DESCRIPTION OF THE DRAWINGS

FIG. 1A is a high-level block diagram of an exemplary E-UTRAN architecture in terms of its constituent components, protocols, and interfaces.

FIG. 1B is a block diagram of exemplary protocol layers of the control-plane portion of the radio (Uu) interface between a user equipment (UE) and the E-UTRAN.

FIG. 1C is a block diagram of an exemplary LTE radio interface protocol architecture from the perspective of the PHY layer.

FIGS. 2A and 2B are block diagrams, respectively, of exemplary downlink and uplink LTE radio frame structures used for frequency division duplexing (FDD) operation;

FIG. 3 shows an exemplary manner in which LTE CCEs and REGs can be mapped to a physical resource.

FIG. 4 shows an exemplary time-frequency resource grid for an NR slot.

FIGS. 5A-B shows various exemplary NR slot configurations.

FIG. 7 is a graphical illustration of downlink linear precoding as currently specified in 3GPP Rel-15.

FIG. 8 shows a high-level block diagram of an exemplary multi-user transmitter that utilizes Tomlinson-Harashima (TH) non-linear precoding (NLP).

FIG. 9 shows a high-level block diagram of an exemplary single-user receiver that is compatible with the multi-user transmitter shown in FIG. 8.

Figure 10A:
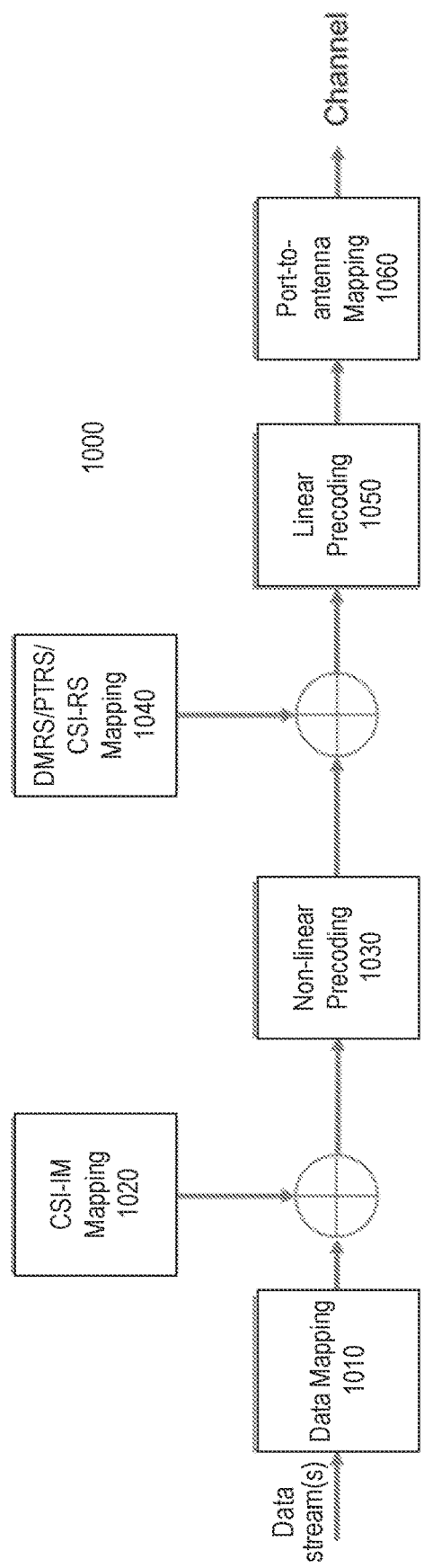
FIGS. 10A-C illustrate various aspects of an exemplary multi-user transmitter that utilizes TH non-linear precoding (NLP), according to various exemplary embodiments of the present disclosure.

While the present disclosure will now be described in detail with reference to the figures, it is done so in connection with the illustrative embodiments and is not limited by the particular embodiments illustrated in the figure(s) or in the appended claims.

DETAILED DESCRIPTION

As briefly mentioned above, there is strong interest within 3GPP to support non-linear precoding (NLP) in upcoming releases, particularly for MU-MIMO precoding, due to its significantly better signal orthogonalization for heavily loaded cells. As explained above, it is desirable that the data symbols and the associated RS (e.g., DM-RS, PT-RS, etc.) undergo the same precoding to facilitate the equivalent channel estimation at the receiver. However, certain operations of non-linear precoding schemes can make these RS ambiguous to the receiver, thereby inhibiting the receiver's ability to determine CSI and/or estimate the channel between the transmitter and receiver. This can greatly reduce the effectiveness of non-linear precoding in actual deployments, as explained in more detail below.

For a DL OFDM resource element (RE) such as shown in FIGS. 2A and 4, the channel from the base station to the UE can be modelled by the equation $$y = Hx + z,$$

where:
  $N_{RX}$ represents the number of UE antenna elements used for reception;
  $N_{TX}$ represents the number of base station antenna elements used for transmission;
  y is an ($N_{RX} \times 1$) complex vector representing the signals measured on the UE's antenna ports;
  x is an ($N_{TX} \times 1$) complex vector representing the signals sent from the BS's antenna ports (e.g., precoded DM-RSs discussed below);
  H is an ($N_{RX} \times N_{TX}$) complex matrix representing the channel for a given OFDM resource element connecting the BS's antenna array with the UE's antenna array. The (i, j)-th element of H, which we denote by $h_{ij}$, models the complex gain of the signal path between the j-th antenna port at the BS and the i-th antenna port at the UE; and
  z is an ($N_{RX} \times 1$) complex vector representing the representing noise in the UE's Rx chains.

As mentioned above, a base station transmitter must employ some type of MIMO precoding to be able to utilize its antenna arrays to achieve expected performance gains. The base station can derive the precoding based on knowledge of the channel H from each transmit antenna to each UE receive antenna. Currently 3GPP Rel-15 only supports linear precoding schemes. The following description is based on two UEs equipped with one Rx antenna each, i.e., $N_{RX}=1$. The same ideas hold for more than two UEs equipped with one Rx antenna each, and small modifications can be made for UEs with two-or-more Rx antennas. In addition, the following description is based on a base station with $N_{TX}=8$ antenna elements, which is common in practice.

A gNB in "MU-MIMO transmission mode" will transmit two separate data or information layers on the same OFDM REs (or RBs), with each layer intended for a different UE. FIG. 6 illustrates an exemplary MU-MIMO scenario where a gNB transmits two complex data symbols, $(s_1, s_2)$, to UE1 and UE2, respectively. The problem is to determine an $(8\times2)$ precoding matrix W that maps these two complex symbols $s_1$ and $s_2$ to the gNB's eight antenna ports as a transmitted vector, x:

$$x = W \begin{bmatrix} s_1 \\ s_2 \end{bmatrix}$$

The transmitted vector x is a $(8\times1)$ complex vector. The DL channel models for UE1 and UE2 are $y_1=H_1x+z_1$ and $y_2=H_2x+z_2$, respectively. Combining these equations gives $$y=HWs+z$$

where $$H = \begin{bmatrix} H_1 \\ H_2 \end{bmatrix}, s = \begin{bmatrix} s_1 \\ s_2 \end{bmatrix}, z = \begin{bmatrix} z_1 \\ z_2 \end{bmatrix} \text{ and } y = \begin{bmatrix} y_1 \\ y_2 \end{bmatrix}.$$

There are many ways to choose the matrix W to create independent information layers to each UE. One conventional technique is to choose some W satisfying the gNB's transmit power constraint and the zero forcing (ZF) condition:

$$HW = \begin{bmatrix} a & 0 \\ 0 & b \end{bmatrix}.$$

Since the off-diagonal elements define the interference between the UEs, the above condition "forces" them to zero. All linear ZF precoders are a type of generalized inverse of the channel matrix H. Thus, the number of streams that can be orthogonalized depends on the size and rank of the channel matrix that is inverted.

In the current example, the maximum number of UEs that can be spatially multiplexed for an ideal full-rank (e.g., rich scattering) environment is 8, corresponding to the number of gNB antenna elements. If the UEs each have two antennas and two layers are spatially multiplexed to each UE, then the theoretical maximum number of UEs is 4.

On the other hand, If the channel is rank deficient (e.g., its elements are correlated) as often happens in practice, then the maximum number of UEs that can be spatially multiplex is reduced to the channel's row rank. Some previous studies have demonstrated that a 64-antenna element gNB could efficiently spatially multiplex 17 single antenna UEs with one layer each, assuming the channel H to each UE is perfectly known. If the channel is not perfectly known by the BS—as is often the case in practice—then the number of UEs that can be spatially multiplex is further reduced.

The 3GPP specifications for MIMO precoding typically do not refer to physical antenna elements. Instead, these standards refer to logical abstractions of antenna elements called antenna ports. The 3GPP specifications define an antenna port with respect to the reference signal (RS) of the corresponding transmission. For example, an antenna port is defined such that the channel over which a symbol on the antenna port is conveyed can be inferred from the channel over which another symbol (e.g., RS) on the same antenna port is conveyed. These reference signals include demodulation reference signal (DM-RS), phase tracking reference signal (PT-RS), and channel state information reference signal (CSI-RS), among others. In this manner, these various RS can be viewed as being associated with the corresponding data channel (or data stream).

In general, DM-RS is used by the UE to estimate the channels of data REs (corresponding to the DM-RS antenna ports) for coherent demodulation of downlink data. In the Rel-15 specifications, DM-RS are linearly precoded by a matrix W in the same way as PDSCH. The UE observes noisy version of the DM-RS at the channel output. The UE's channel estimation algorithm tries to estimate the corresponding channel seen by DM-RS, which includes propagation channel H, multi-antenna precoding W, and the reference signal port to physical antenna mapping F. In other words:

$$H_{DMRS}=HFW.$$

The UE's estimate of $H_{DMRS}$, i.e., $\hat{H}_{DMRS}$, can be used to coherently demodulate data because DM-RS and PDSCH are associated by transmission over the same antenna ports and, therefore, include the linear precoding, same antenna mapping, and same propagation channel.

CSI-RS mapping has slight difference compared with the DM-RS in terms of precoders that it goes through before reception. Since a primary purpose of CSI-RS is to obtain the channel state information and noise/interference estimates for link adaptation and precoder suggestions to the gNB, a baseline for the CSI-RS mapping is that it at least goes through the physical antenna mapping F before experiencing the channel H. In other word, the multi-antenna precoder for CSI-RS can be different from W. If the matrix U represents the multi-antenna precoder for CSI-RS, the design of U can be flexible. For instance, in codebook-based precoding schemes, the U matrix can be set to be the identity matrix. On the other hand, in the reciprocity-based MIMO transmission, in order to reduce the number of CSI-RS ports, the matrix U can be calculated based on the UL channel estimation.

There is also the possibility to configure CSI-RS resources to measure interference and noise at the UEs. In other words, the gNB can configure the CSI-Interference Measurement (CSI-IM) resources such that they can mimic the PDSCH transmission of interfering gNBs. In such case, the gNB can apply a precoder W of interfering gNBs to the CSI-IM resources, i.e., U=W.

FIG. 7 is a graphical illustration of linear DL precoding in 3GPP Rel-15 specifications. As illustrated in FIG. 7, DM-RS undergoes the same precoding as an associated PDSCH. On the other hand, CSI-RS undergoes the same port-to-antenna mapping, F, as the associated PDSCH, but it also undergoes a multi-antenna precoding that may be the same as or different than the associated PDSCH.

There has been interest in 3GPP for standardizing non-linear precoding schemes. In general, a "non-linear" precoding scheme is one that does not follow linear system principles and/or properties. For example, given input data streams $X_1$, $X_2$ and output data streams $Y_1$, $Y_2$, a precoding scheme W is non-linear if it fails to satisfy the following superposition property:

$$aY_1+bY_2=W\{aX_1+bX_2\}.$$

The interest in non-linear precoding is based on its potential to provide significantly better signal orthogonalization for heavily loaded cells, where the number of UEs approaches the minimum of the number of base station antenna elements and the channel rank, as discussed above. The basic principle of non-linear precoding is to pre-subtract (or pre-cancel) inter-stream interference at the base station transmitter using a nonlinear operation, rather than taking linear transformation. This can reduce and/or mitigate mutual interference between the DL data streams transmitted to the respective UEs. The strategy of pre-cancelling interference is also known as "dirty-paper coding" (DPC), and theoretical studies have shown it to be optimal for various simplified communications models.

However, the full or theoretical version DPC cannot be implemented in practice because its complexity increases exponentially with the length of the channel code block. A feasible but suboptimal variant is called Tomlinson-Harashima (TH) precoding. The basic idea of TH precoding is to include a feedback filter for successive interference pre-cancellation and a feedforward filter based on the triangularization of the channel matrix. The feedback filtering involves a nonlinear operation, but the feedforward filtering is a linear operation.

FIG. 8 shows a high-level block diagram of an exemplary multi-user transmitter that utilizes TH non-linear precoding (NLP). The transmitter receives a DL data stream $c_i(t)$, i=1 . . . K, for each of K UEs. NLP is first applied, followed by a linear precoding. The NLP for data stream $c_1(t)$ involves a modulo operation, whereas the NLP for the other data streams $c_i(t)$, i=2 . . . K, involve both a feedback (FB) filter and the modulo operation. The linear precoding involves respective feedforward (FF) filters for the respective output streams from the NLP. The outputs of the respective FF filters are summed and/or combined and provided to the Nix antennas for transmission.

The FF filter is used to triangularize the channel. The optimal choice of FF filter depends on the available CSI at the transmitter, transmit powers, and noise levels. The FB filter is used to model the inter-user interference (IUE) observed at the receiving UEs, to be cancelled within the NLP encoder. The optimal choice of FB Filter depends not only on the available CSI at UE, transmit power, and noise levels, but also on the chosen FF Filter. An important step in this precancellation within the NLP is a modulo operation to "wrap" pre-cancelled data symbols that fall outside the desired operating range of the gNB's power amplifier (e.g., beyond the gNB's transmit power constraint). In general, this wrapping is used to meet the transmit power requirements of all TH-based nonlinear precoding schemes. As shown in FIG. 8, each user data stream undergoes a modulo operation, $\Lambda i$, i=1 . . . K.

FIG. 9 shows a high-level block diagram of an exemplary single-user receiver that is compatible with the multi-user transmitter shown in FIG. 8. Initially, linear filtering can be applied to all signals received from the $N_{RX}$ receive antennas (e.g., $N_{RX}$=1). The subsequent decoding of the NLP applied in the transmitter involves a linear filter, Bk, and a modulo operation, $\Lambda k$, applied to the received data stream. Both the linear filter, Bk, and the modulo operation, $\Lambda k$, can be based on (e.g., substantially identical to) the corresponding operations in the transmitter for that particular user. For example, the receiver modulo operation, $\Lambda k$, can "unwrap" the "wrapping" performed by the corresponding modulo operation, $\Lambda k$, in the transmitter NLP.

As discussed above and illustrated in FIG. 7, it is desirable to transmit various RS together with a data stream to facilitate various measurements and/or estimates needed for transmitting (e.g., precoding) or receiving (e.g., channel estimation) the data stream. However, various problems can occur when reference signals and antenna ports (e.g., for data streams) are combined with non-linear precoding, as discussed below.

For example, the DM-RS REs will undergo NLP in the same way as the data REs, which will introduce non-linear distortion for channel estimation at the receiver. If PT-RS are also used, they will also experience this non-linear distortion. To demodulate the data, the receiver is interested in the effective channel, which is the combination of spatial precoding (W) and the wireless channel (H). However, the distortion introduced by NLP of these RS inhibits and/or prevents the receiver from obtaining accurate channel estimates needed for correct data demodulation. For example, the TH NLP modulo operation can introduce ambiguity to these RS, thereby destroying the channel equivalence and/or correspondence with the data stream.

As another example, CSI-RS resources can be used by a UE for either same-user channel estimation (e.g., for precoding) and for multi-user interference measurement (e.g., CSI-IM), as discussed above. However, the current design of CSI-RS resources is insufficient to serve both purposes when NLP is applied.

Exemplary embodiments of the present disclosure address these and other problems, issues, and/or drawbacks by providing techniques and/or mechanisms for mapping reference signals (RS) at a multi-user transmitter when non-linear precoding (NLP) is applied, thereby facilitating correct data demodulation at the receiver. For example, by not introducing non-linear distortion into the RS used for channel estimation and phase tracking, such techniques can enable the receiver to estimate the effective channel that can be used for data demodulation. At the same time, such techniques enable a receiver to measure non-linear interference resulting from the NLP at the transmitter. In this manner, such techniques facilitate deployment of NLP in network transmitters and compatible UE receivers, thereby realizing the network capacity gains over linear precoding.

FIG. 10A shows a high-level block diagram of an exemplary multi-user transmitter that utilizes TH non-linear precoding (NLP), according to various exemplary embodiments of the present disclosure. Although the functionality of the transmitter 1000 is divided into particular blocks shown in FIG. 10A, this division is merely exemplary, such that the transmitter functionality can be further combined, further subdivided, and/or rearranged into blocks with different types and/or amounts of functionality than shown.

In general, FIG. 10A illustrates physical-layer (PHY) functionality of transmitter 1000. As shown in FIG. 10A, transmitter 1000 receives one of more data streams, e.g., from a higher layer. In block 1010, transmitter 1010 maps these data streams to one or more resource grids, such as shown in FIGS. 2A and 4. In block 1020, transmitter 1000 selects one or more CSI RS for multi-user interference measurements (e.g., CSI-IM), and maps these selected CSI-IM to the same resource grid(s) as the data stream(s). Put a different way, transmitter 1000 multiplexes the data stream(s) and CSI-IM together into respective resource grid(s). In some embodiments, the one or more CSI RS selected for CSI-IM can be non-zero-power CSI-RS (NZP-CSI-RS).

Figure 10B:
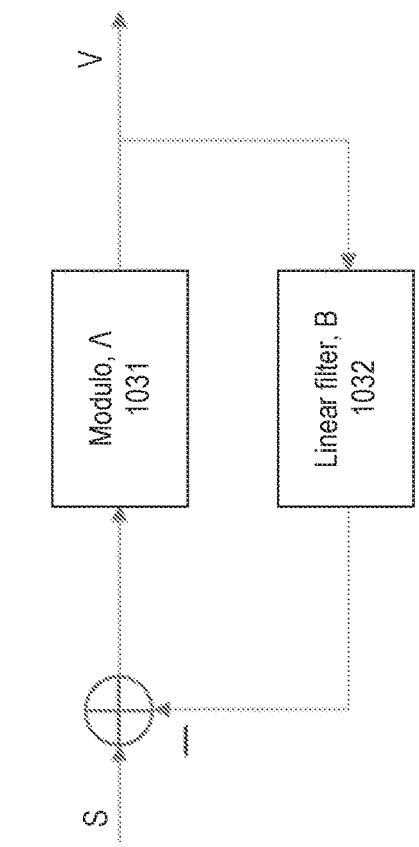

In NLP block 1030, transmitter 1000 applies non-linear precoding (NLP) to the combination of the data stream(s) and the CSI-IM. FIG. 10B shows a high-level block diagram of an exemplary embodiment of block 1030 that utilizes TH NLP. In this embodiment, a linear filter (B) 1032 is applied to the feedback of the output (V) of block 1030. A difference is then taken between the input (S) of block 1030 and the output of linear filter 1032, and the difference is then applied to the input of modulo operation (A) 1031. The output of modulo operation 1031 is the output (V) of NLP block 1030.

In some embodiments, S represents the modulated data symbol vector for a RE, $S \in C^K$, where K is the number of transmitter antennas. In such embodiments, linear filter $B \in C^{K \times K}$ is a strictly lower triangular matrix. The modulo operation is used to guarantee that the output symbols $V=[v_1, v_2, \ldots, v_K]^T \in C^K$ after the feedback satisfy a certain constraint, e.g., a transmit power constraint. More specifically, the modulo operation can limit the symbols $v_k = s_k - \sum_{j=1}^{k-1} B_{k,j} v_j$ to a certain region D in the complex number domain, where D may depend on the transmit power constraints. In this manner, the modulo operation can be viewed as "correcting" any symbols outside of region D. The basis for the modulo operation—region D—is generally known in both transmitter and receiver. The feedback decision matrix B depends on the available channel state information (CSI).

Figure 10C:
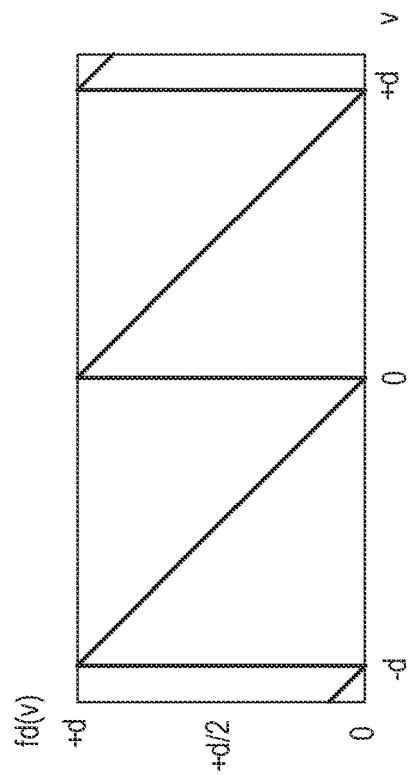

The operations of exemplary block 1030 shown in FIG. 10B can be described by the following linear model:

$$V=(I+B)^{-1}(S+i),$$

where $i=[i_1, i_2, \ldots, i_K]^T \in C^K$ represents the modulo offset of the modified data symbol from S. This equivalent linear model is used in the following explanation of the proposed solution for various RS mappings. FIG. 10C shows an input-output relationship of an exemplary modulo function that can be used for the operation of block 1031 shown in FIG. 10B. The modulo function $f_d(v)$ shown in FIG. 10C can be also be defined mathematically as:

$$f_d(v) = v - \left\lfloor \left( \frac{v - \frac{d}{2}}{d} \right) \right\rfloor d,$$

where input v is any real number and d is a positive real number that is based on the transmitter power constraint and/or a modulation and coding scheme (MCS) used (e.g., modulation constellation).

As briefly mentioned above, the matrix B of the NLP depends on CSI from the receiver. In a practical setting this CSI will be non-ideal, which means that the NLP will not be able to cancel all interference among co-scheduled users. The interference caused by a co-scheduled UE's PDSCH transmission can be mimicked by mapping NZP-CSI-RS resources configured for CSI-IM together with the data before the NLP. This allows the receiver to measure the inter-user interference based on the CSI-IM, which the receiver can take into account when recommending a precoder and/or modulation and coding scheme (MCS) to the transmitter.

Returning to FIG. 10A, in block 1040, transmitter 1000 selects one or more RS for receiver measurements other than multi-user interference. These selected RS can include DM-RS, PT-RS, and/or CSI-RS (e.g., NZP-CSI-RS) for same-user channel estimation. Transmitter 1000 maps these selected RS to the same resource grid(s) as the output of block 1030, i.e., the non-linear precoded data stream(s) and CSI-IM. Put a different way, transmitter 1000 multiplexes the non-linear precoded data stream(s) and CSI-IM together with the DM-RS, PT-RS, and/or CSI-RS into respective resource grid(s). In this manner, the DM-RS, PT-RS, and/or CSI-RS mapped in block 1040 do not experience the NLP of block 1030.

DM-RS and/or PT-RS can be mapped to the resource grid in block 1040 with the various layer-to-port associations, according to various exemplary embodiments. In the following explanations, $V \in C^K$ is a data vector that has been modified or corrected by the non-linear precoding operation of block 1030. For each data layer or stream $v_k$, there is a corresponding DM-RS port g(k) composed of symbols $m_{g(k)}$ to be associated and mapped in the same layer of the resource grid as $v_k$. In some embodiments, a one-to-one mapping g: [1:K]→[1:K] can be used such that for any $k \in [1:K]$, there is a unique $g(k) \in [1:K]$, and $g(i) \neq g(k)$ if $i \neq k$.

Figure 12C:
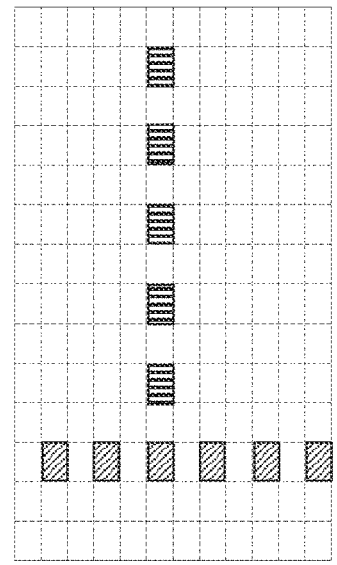
FIGS. 12A-C show three time-frequency grids of resource elements (REs) that illustrate three exemplary RS mapping arrangements, according to various exemplary embodiments of the present disclosure.
Figure 12B:
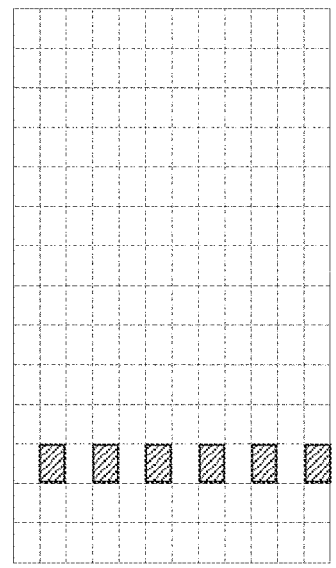
Figure 12A:
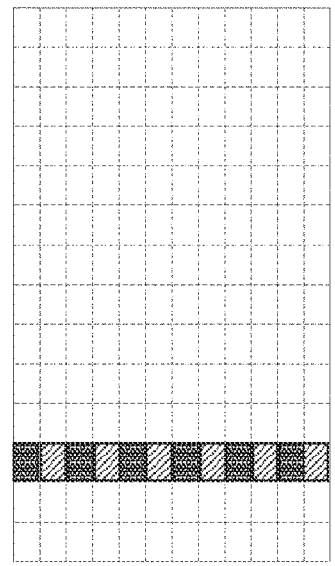

In some embodiments, the multiplexing of the data stream and the associated RS (e.g., DM-RS, PT-RS, etc.) can be frequency- or/and time-orthogonalized. FIGS. 12A-C show three time-frequency grids of resource elements (REs) that illustrate three different exemplary RS mapping arrangements, according to various exemplary embodiments of the present disclosure. In FIG. 12A, two different DM-RS ports (0 and 1) are time-multiplexed with the associated NLP data stream, such that the DM-RS ports are mapped to one OFDM symbol of a subframe, and the associated NLP data stream is mapped to other symbols of the subframe. In FIG. 12B, a single DM-RS port (0) is time- and frequency-multiplexed with the associated NLP data stream, such that the DM-RS port is mapped to certain REs of an OFDM symbol and the associated NLP data stream is mapped to other REs of the same symbol and to REs of other symbols of the subframe. In FIG. 12C, a single DM-RS port (0) and a single PT-RS port (0) are time- and frequency-multiplexed with the associated NLP data stream.

In some embodiments, each "port" or "stream" of DM-RS can be mapped in association with one specific data stream regardless of whether non-linear precoding is enabled. In some embodiments, each "port" or "stream" of PT-RS can be mapped in association with one or many data streams, or alternatively with one specific DM-RS port, regardless of whether non-linear precoding is enabled.

Returning to FIG. 10A, in block 1050, linear precoding is applied to the combination of the non-linear precoded data stream(s) and CSI-IM, together with the DM-RS, PT-RS, and/or CSI-RS. In some embodiments, the linear precoder 1050 can be chosen from a codebook, such as specified in 3GPP TS 38.214. In some embodiments, the linear precoder 1050 may be determined based on measurements of reverse-link (e.g., UL) RS and a principle and/or assumption of reciprocity. In some embodiments, the linear precoder 1050 can be an identity matrix. In some embodiments, linear precoder 1050 can be configured so that it is transparent at the receiver side.

In block 1060, a port-to-antenna mapping is applied to the output of the linear precoding in block 1050, with the resulting signals being transmitted to one or more receivers via the channel(s).

Figure 11:
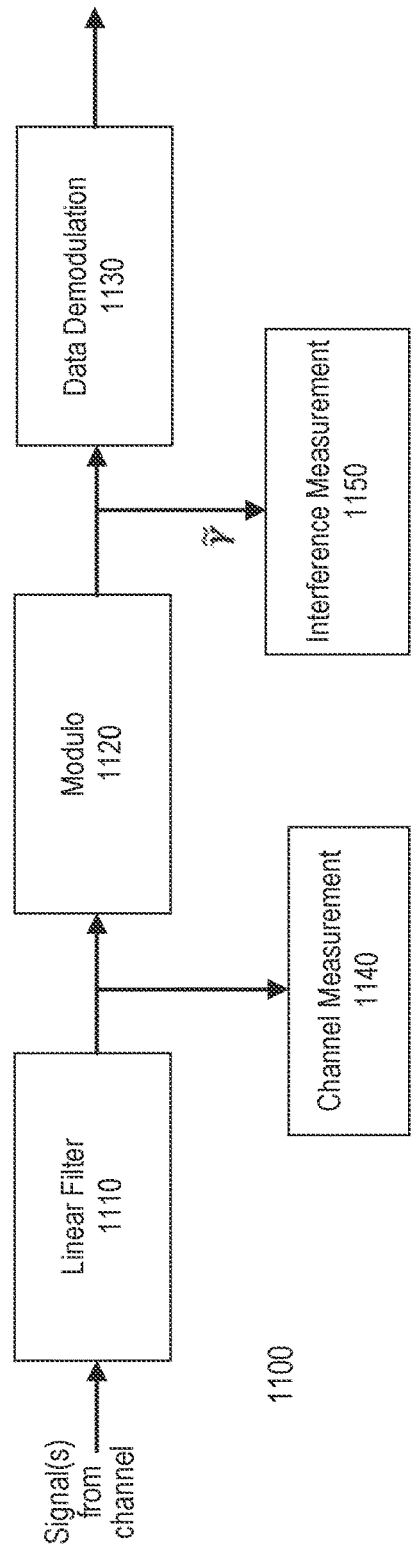
FIG. 11 shows a high-level block diagram of an exemplary single-user receiver that is compatible with the multi-user transmitter shown in FIG. 10, according to various exemplary embodiments of the present disclosure.

FIG. 11 shows a high-level block diagram of an exemplary single-user receiver that is compatible with the multi-user transmitter shown in FIG. 10, according to various exemplary embodiments of the present disclosure. Although the functionality of the receiver 1100 is divided into particular blocks shown in FIG. 11, this division is merely exemplary, such that the receiver functionality can be further combined, further subdivided, and/or rearranged into blocks with different types and/or amounts of functionality than shown.

Initially, a linear filter 1110 can be applied to the signal(s) received from the channel. Linear filter 1110 can be based on, similar to, and/or substantially identical to transmitter linear filter 1032 shown in FIG. 10B. In some embodiments, linear filter 1110 can also be based on linear precoding 1050 shown in FIG. 10A.

The output of the linear filter 1110 corresponds to the receiver's version of the transmitted multiplexed combination of the non-linear precoded data stream(s) and CSI-IM, together with the DM-RS, PT-RS, and/or CSI-RS. The output of linear filter 1110 is then demultiplexed into the DM-RS, PT-RS, and/or CSI-RS (i.e., RS without NLP) and the combination of data stream(s) and CSI-IM (i.e., with NLP). The DM-RS, PT-RS, and/or CSI-RS are then input to a channel measurement block 1140. This enables the receiver to perform accurate channel and/or phase estimates and CSI measurements without non-linear distortion introduced by the NLP operation in the transmitter. CSI measurements (or representations thereof) can be fed back to the transmitter, as discussed above.

The following is a description of exemplary embodiments in which channel measurement 1140 can be performed based on DM-RS. In other embodiments, channel measurement 1140 can be performed based on CSI-RS according to similar principles. In the following description:

$H \in C^{N_{RX} \times N_{TX}}$ represents the propagation channel between the BS and UE, where $N_{RX}$ and $N_{TX}$ represent the number of receiver antennas and transmitter antennas, respectively.

$W \in C^{N_{TX} \times K}$ represents the linear precoder.

$N \in C^{N_R}$ represents noise at the receiver side.

Using this nomenclature, the data part of the received signal can be represented as $$Y_d = H\overline{W}V + N = \tilde{H}V + N,$$

and the DM-RS part of the received signal can be represented as $$Y_{rs} = H\overline{W}M + N = \tilde{H}M + N.$$

The receiver's goal is to estimate the effective/virtual channel $\tilde{H}$ experience by the data part based on measurements of the DM-RS. As can be seen from the presence of $\tilde{H}$ in both of the above equations, the reference signals M (e.g., DM-RS) experienced the same channel as the non-linear precoded data V. Accordingly, mapping DM-RS according to the exemplary embodiments facilitates receiver channel estimation according to this goal.

In addition, the combination of the data stream(s) and CSI-IM is input to modulo operation 1120, which can be substantially identical to the modulo operation 1031 shown in FIG. 10B and discussed above. In other words, receiver 1100 can be aware of the modulo region D, or function $f_d$(v), used by the transmitter 1000 and can apply a substantially identical operation in block 1120. In some embodiments, receiver 1100 can obtain this information from the transmitter via downlink control information (DCI) over PDCCH. As an example, receiver 1100 can determine the modulo region D, or function $f_d$(v), used by the transmitter 1000 based on a modulation and coding scheme (MCS) indicated by DCI. In this manner, receiver 1100 can "unwrap" or correct the "wrapping" operation applied to the data stream(s) and CSI-IM by transmitter 1000.

The output of the modulo operation 1120 corresponds to the receiver's version of the multiplexed combination of the data stream(s) and CSI-IM (e.g., input to block 1030 in FIG. 10A). The output of modulo operation 1120 is then demultiplexed into the CSI-IM, which is input to interference measurement block 1150, and the data stream(s), which is(are) input to data demodulator block 1130. The multi-user interference measurements can be fed back to the transmitter, and the output bits from the data demodulator 1130 can be consumed by various receiver (e.g., UE) applications.

Certain exemplary embodiments of the interference measurement in block 1150 are described as followings. Consider a MU-MIMO transmission where each receiver (e.g., UE) is configured with single PDSCH layer. Let $S=[s_1, s_2, \ldots, s_K]^T \in C^K$ be a transmitter data symbol vector before NLP (e.g., input to block 1030 of FIG. 10A), where $s_i$ represents the data symbol for user i, $i \in [1:K]$. Using the same nomenclature as above, the received signal of user k can be represented by:

$$Y_k = H_k P(I+B)^{-1}(S+i),$$

where $H_k$ represents the channel state information matrix, P represents the linear precoder, and $(I+B)^{-1}$ represents the NLP. The linear precoder P and the non-linear precoder $(I+B)^{-1}$ are designed based on an estimated version of $H_k$, namely, $\hat{H}_k$, or a function of $\hat{H}_k$. Therefore, inter-user interference may be introduced in the received signal of $Y_k$.

As discussed above, inter-user interference measurements can be facilitated by configure one or more CSI-IM resources (e.g., NZP-CSI-RS) for user k, with these CSI-IM resources being mapped to resource grid before the NLP operation in transmitter 1000. If one CSI-IM is configured per user, let $\gamma=[\gamma_1, \gamma_2, \ldots, \gamma_d]$ represents the CSI-RS pilots for all K ports, in which $\gamma_k=0$ and $\gamma_{\tilde{k}}$, $\tilde{k} \neq k$ are picked from the NZP-CSI-RS ports sequence generation. It is important that the CSI-RS symbols $\gamma_{\tilde{k}}$ have the same average power as the data symbols $s_{\tilde{k}}$. In such case, the received signal in the CSI-IM resources for user k can be represented as:

$$\tilde{Y}_k = H_k P(I+B)^{-1}(\gamma+i).$$

The above relationship illustrates that the receiver can perform a measurement and/or estimate $\tilde{\gamma}$ of cross-user interference $\gamma$ after the linear filter 1110 and modulo operation 1120 on $\tilde{Y}_k$ removes the effects of the corresponding transmitter operations on the CSI-IM, leaving only the inter-user interference for user k. Even so, the estimated non-linear interference $\tilde{\gamma}$ has to be confined within the modulo boundaries, e.g., region D.

Figure 13:
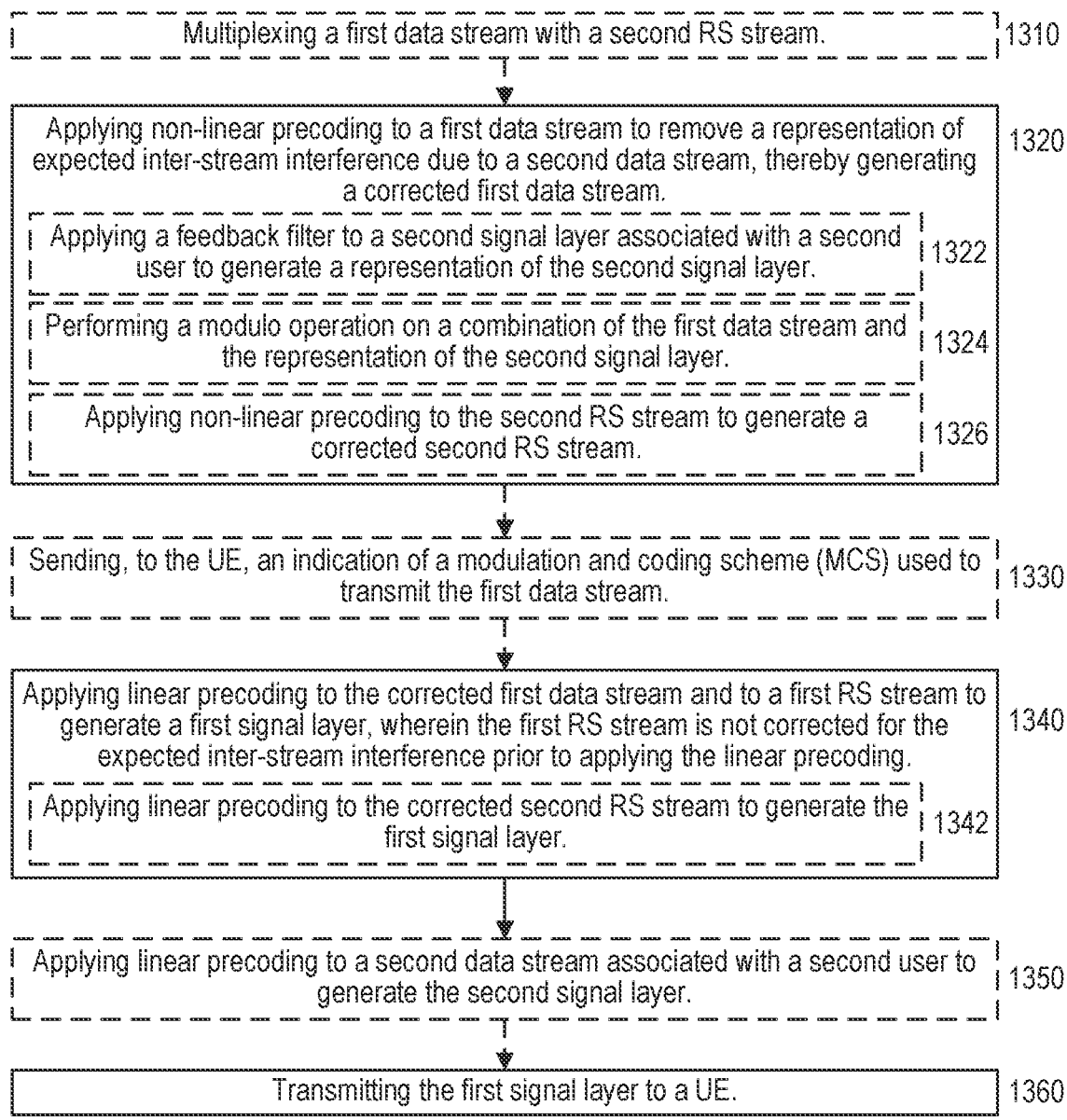
FIG. 13 shows a flow diagram of an exemplary method and/or procedure performed by a network node (e.g., base station, gNB, eNB, ng-eNB, en-gNB, etc. or component thereof) in a wireless network, according to various exemplary embodiments of the present disclosure.

FIG. 13 shows a flow diagram of an exemplary method and/or procedure for operating a network node in a wireless network, according to various exemplary embodiments of the present disclosure. The exemplary method and/or procedure can be performed by a network node (e.g., base station, eNB, gNB, ng-eNB, en-gNB, etc., or component thereof) of the wireless network (e.g., E-UTRAN, NG-RAN, etc.), in communication with the one or more user equipment (e.g., UE, wireless device, IoT device, modem, etc. or component thereof), such as described herein with reference to other figures. Furthermore, the exemplary method and/or procedure shown in FIG. 13 can be utilized cooperatively with other exemplary methods and/or procedures described herein to provide various exemplary benefits and/or advantages, including those described herein. Although FIG. 13 shows blocks in a particular order, this order is exemplary and the operations of the exemplary method and/or procedure can be performed in a different order than shown, and can be combined and/or divided into blocks having different functionality than shown. Optional blocks or operations are indicated by dashed lines.

In some embodiments, the exemplary method and/or procedure can include the operations of block 1310, where the network node can multiplex a first data stream with a second reference signal (RS) stream. The data stream can be associated with a single user and/or a single UE, and the second RS stream can be associated with the first data stream. For example, the second RS stream can include channel state information RS (CSI-RS) that are configured to facilitate inter-user interference measurements by the UE.

The exemplary method and/or procedure can include the operations of block 1320, where the network node can apply non-linear precoding to the first data stream to remove a representation of expected inter-stream interference due to a second data stream, thereby generating a corrected first data stream. In some embodiments, the non-linear precoding can include Tomlinson-Harashima precoding. In some embodiments, the first and second data streams can be associated with respective first and second users.

In some embodiments, the operations of block 1320 can include the operations of sub-block 1324, where the network node can perform a modulo operation on a combination of the first data stream and a representation of a second signal layer associated with the second user. In such embodiments, the modulo operation can be performed with respect to a maximum transmit power constraint and a modulation and coding scheme (MCS) used to transmit the first data stream. In some embodiments, the operations of block 1320 can also include the operations of sub-block 1322, where the network node can apply a feedback filter to the second signal layer (i.e., associated with the second user) to generate the representation of the second signal layer used in block 1324.

In embodiments that include the operations of block 1310, the operations of block 1320 can include the operations of sub-block 1326, where the network node can also apply non-linear precoding to the second RS stream to generate a corrected second RS stream. Put a different way, in these embodiments, the network node can apply the non-linear precoding to the multiplexed first data stream and second RS stream, thereby generating corrected versions.

In some embodiments, the exemplary method and/or procedure can include the operations of block 1330, where the network node can send an indication of the MCS to the UE. For example, the network node can send the MCS indication as DCI via PDCCH.

The exemplary method and/or procedure can also include the operations of block 1340, where the network node can apply linear precoding to the corrected first data stream and to a first RS stream to generate a first signal layer. Note, however, that the first RS stream is not corrected for the expected inter-stream interference prior to applying the linear precoding. In some embodiments, the first RS stream can include first CSI-RS, that are configured to facilitate same-user channel measurements by the UE.

In embodiments that include the operations of block 1326, where the corrected second RS is generated, the linear precoding can also be applied to the corrected second RS stream to generate the first signal layer, which is represented by sub-block 1342 in FIG. 13. Put a different way, in such embodiments, the network node can apply the linear precoding in block 1340 to a multiplexed combination of the corrected first data stream, the corrected second RS stream, and the first RS stream to generate the first signal layer.

In some embodiments, the first RS stream is related to one or more first ports of RS that are associated with the first data stream. As explained in more detail above, the first ports of RS can be associated with the first data stream in a manner that facilitates receiver estimation of propagation channel characteristics experienced by the received first data stream, based on measurements made on the received RS. In various embodiments, each of the first ports can correspond to one of the following types of RS: DM-RS, PT-RS, and CSI-RS.

In some embodiments, a particular first port can correspond to DM-RS, and a further first port can correspond to PT-RS. In such embodiments, the further first port can be associated with the particular first port, and the particular first port and the further first port can be time- and frequency-multiplexed with the corrected first data stream. In other embodiments, both the particular and further first ports can correspond to DM-RS, and the particular first port and the further first port are time-multiplexed with the corrected first data stream.

In some embodiments, the exemplary method and/or procedure can also include the operations of block 1350, where the network node can apply linear precoding to the second data stream to generate the second signal layer. For example, the second signal layer generated in this manner can be utilized in the non-linear precoding operations of block 1320, as described above.

The exemplary method and/or procedure can also include the operations of block 1360, where the network node can transmit the first signal layer to a UE. For example, the network node can transmit the first data stream comprising the first signal layer using the MCS that was indicated to the UE in block 1330.

Figure 14:
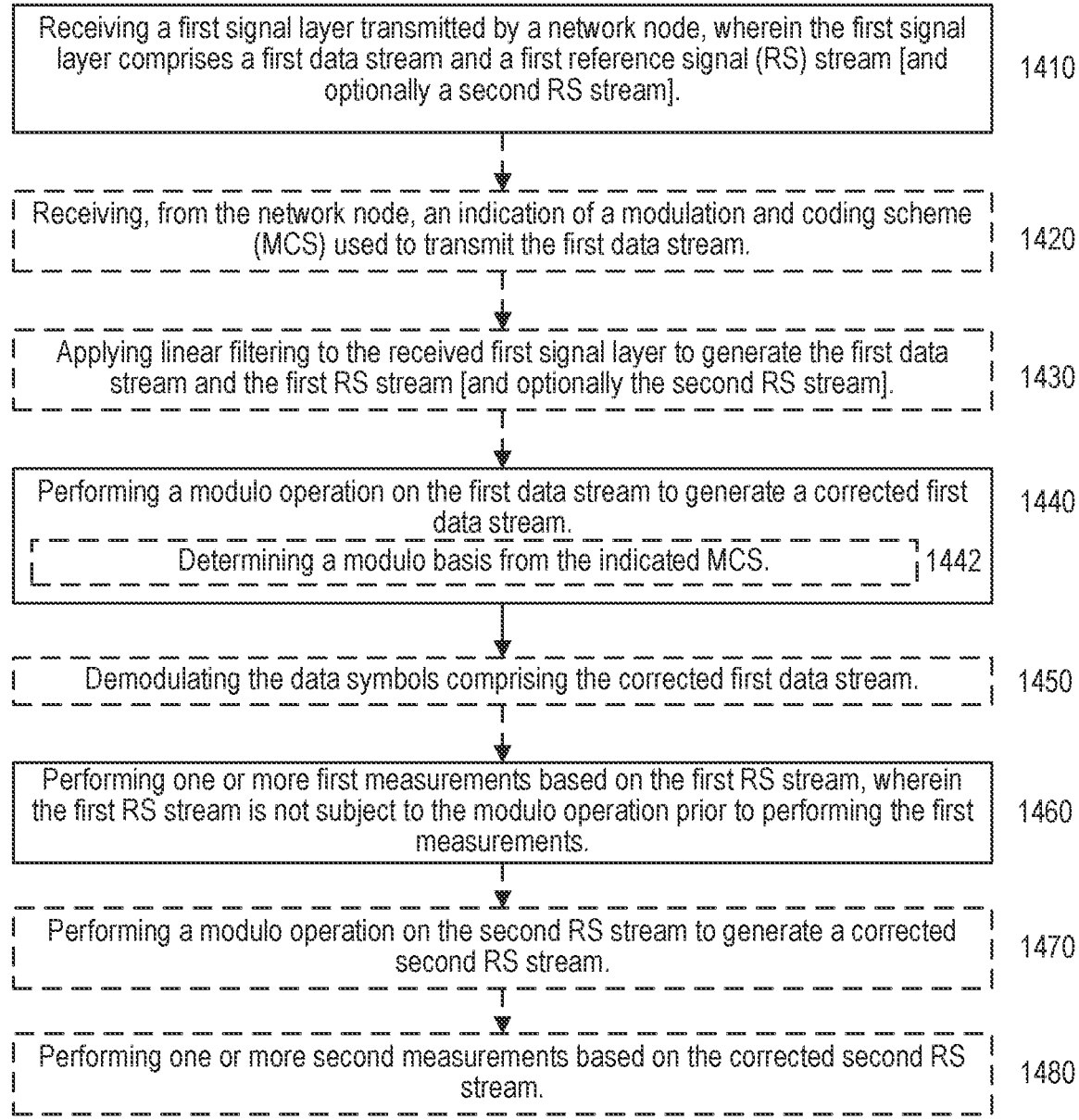
FIG. 14 shows a flow diagram of an exemplary method and/or procedure performed by a user equipment (UE, e.g., wireless device, MTC device, NB-IoT device, modem, etc. or component thereof), according to various exemplary embodiments of the present disclosure.

FIG. 14 shows a flow diagram of an exemplary method and/or procedure for operating a user equipment in a wireless network, according to various exemplary embodiments of the present disclosure. The exemplary method and/or procedure can be performed by a user equipment (e.g., UE, wireless device, IoT device, modem, etc. or component thereof) in communication with a network node (e.g., base station, eNB, gNB, ng-eNB, en-gNB, etc., or component thereof) in the wireless network (e.g., E-UTRAN, NG-RAN, etc.), as described herein with reference to other figures. Furthermore, the exemplary method and/or procedure shown in FIG. 14 can be utilized cooperatively with other exemplary methods and/or procedures described herein to provide various benefits and/or advantages, including those described herein. Although FIG. 14 shows blocks in a particular order, this order is exemplary and the operations of the blocks can be performed in a different order than shown, and can be combined and/or divided into blocks having different functionality than shown. Optional blocks or operations are indicated by dashed lines.

The exemplary method and/or procedure can include the operations of block 1410, where the UE can receive a first signal layer transmitted by a network node. The first signal layer can include a first data stream and a first RS stream. In some embodiments, the first signal layer can also include a second RS stream. In some embodiments, the first RS stream can include one or more first CSI-RS, and the second RS stream can include one or more second CSI-RS.

In some embodiments, the first RS stream is related to one or more first ports of RS that are associated with the first data stream. As explained in more detail above, the first ports of RS can be associated with the first data stream in a manner that facilitates receiver estimation of propagation channel characteristics experienced by the received first data stream, based on measurements made on the received RS. In various embodiments, each of the first ports can correspond to one of the following types of RS: DM-RS, PT-RS, and CSI-RS.

In some embodiments, a particular first port can correspond to DM-RS, and a further first port can correspond to PT-RS. In such embodiments, the further first port can be associated with the particular first port, and the particular first port and the further first port can be time- and frequency-multiplexed with the corrected first data stream. In other embodiments, both the particular and further first ports can correspond to DM-RS, and the particular first port and the further first port are time-multiplexed with the corrected first data stream.

In some embodiments, the exemplary method and/or procedure can also include the operations of block 1420, where the UE can receive, from the network node, an indication of a modulation and coding scheme (MCS) used to transmit the first data stream. For example, the UE can receive the MCS indication as DCI via PDCCH.

In some embodiments, the exemplary method and/or procedure can also include the operations of block 1430, where the UE can apply linear filtering to the received first signal layer to generate the first data stream and the first RS stream. In embodiments where the first signal layer also includes the second RS stream, the linear filtering can also be applied to generate the second RS stream. Put a different way, in such embodiments, the UE can apply the linear filtering in block 1430 to the first signal layer to generate the first data stream, the first RS stream, and the second RS stream.

The exemplary method and/or procedure can also include the operations of block 1440, where the UE can perform a modulo operation on the first data stream to generate a corrected first data stream. In some embodiments, the operations of block 1440 can include the operations of sub-block 1442, where the UE can determine a modulo basis from the indicated MCS, e.g., received in block 1420. For example, based on the MCS, the UE can determine the region D and/or function $f_d(v)$ used by a corresponding non-linear precoding operation in the network node transmitter.

In some embodiments, the exemplary method and/or procedure can also include the operations of block 1450, where the UE can demodulate the data symbols comprising the corrected first data stream.

The exemplary method and/or procedure can also include the operations of block 1460, where the UE can perform one or more first measurements based on the first RS stream. Note, however, that the first RS stream is not subject to the modulo operation (e.g., in block 1440) prior to performing the first measurements. In various embodiments, the first measurements can be same-user channel measurements, which can be based on any of DM-RS, PT-RS, and CSI-RS comprising the first RS stream.

In some embodiments, the exemplary method and/or procedure can also include the operations of block 1470, where the UE can perform a modulo operation on the second RS stream to generate a corrected second RS stream. In such embodiments, the exemplary method and/or procedure can also include the operations of block 1480, where the UE can perform one or more second measurements based on the corrected second RS stream. In contrast to the first RS stream, however, the corrected second RS has been subject to the modulo operation (e.g., in block 1470) prior to performing the second measurements. In various embodiments, the second measurements can be inter-user interference measurements, which can be based on CSI-RS comprising the first RS stream.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 15:
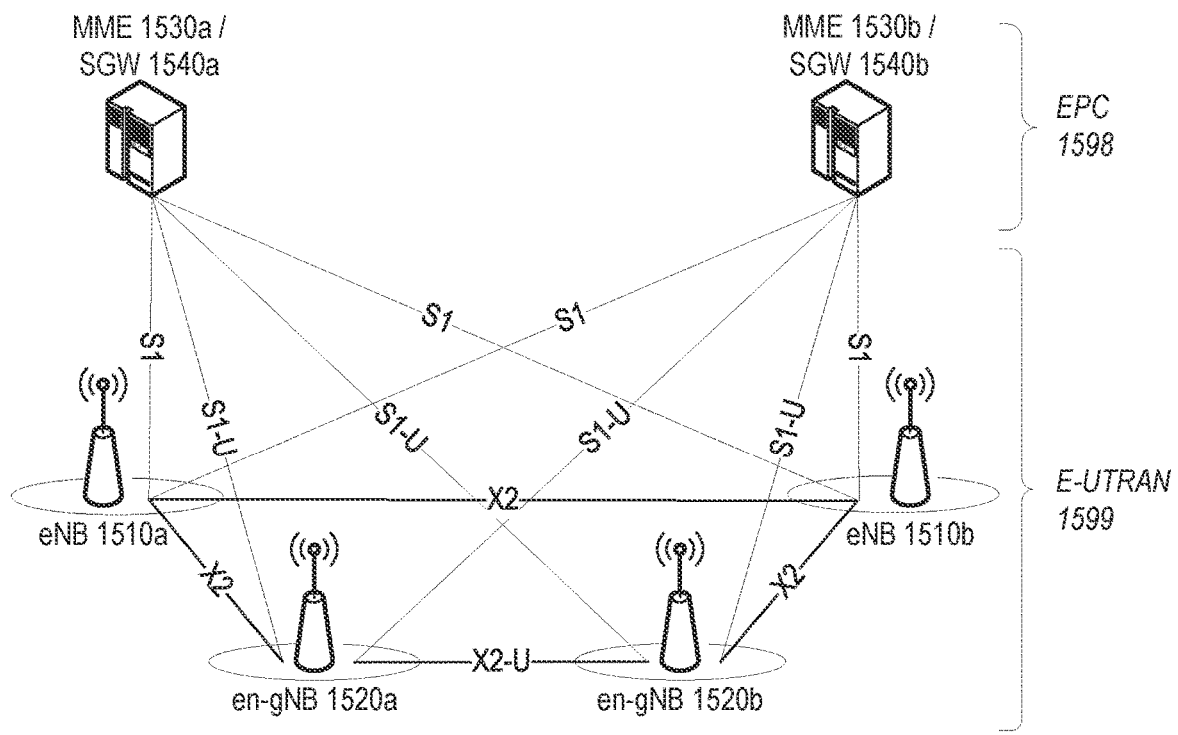
FIG. 15 shows a high-level view of an exemplary LTE network architecture, including a Evolved UTRAN (E-UTRAN) and an Evolved Packet Core (EPC).

FIG. 15 shows a high-level view of an exemplary 4G/LTE network architecture, including a Evolved UTRAN (E-UTRAN) 1599 and a Evolved Packet Core (EPC) 1598. As shown in the figure, E-UTRAN 1599 can include eNBs 1510 (e.g., 1510*a,b*) and en-gNBs 1520 (e.g., 1520*a,b*) that are interconnected via respective X2 or X2-U interfaces, as the case may be. The eNBs and en-gNBs are also connected via S1 (or S1-U) interfaces to EPC 1598. In general, E-UTRAN 1599 is responsible for all radio-related functions in the network, including radio bearer control, radio admission control, radio mobility control, scheduling, and dynamic allocation of resources to UEs in uplink and downlink, as well as security of the communications with the UE. These functions reside in the individual radio nodes, such as eNBs 1510*a,b* and en-gNBs 1520*a,b*.

Collectively, the MME/S-GW handles both the overall control of the UE and data flow between the UE and the rest of the EPC. More specifically, however, the MME processes the signaling protocols between the UE and the EPC, which are known as the Non-Access Stratum (NAS) protocols. On the other hand, the S-GW handles all Internet Protocol (IP) data packets between the UE and the EPC, and serves as the local mobility anchor for the data bearers when the UE moves between individual radio nodes, such as eNBs 1510*a,b* and en-gNBs 1520*a,b*.

Each of the eNBs 1510 can support the LTE radio interface, including frequency division duplexing (FDD), time division duplexing (TDD), or a combination thereof. In contrast, each of en-gNBs 1520 supports the NR radio interface but connect to the EPC via the S1-U interface. In addition, the eNBs 1510 and en-gNBs 1520 can provide multi-RAT (radio access technology) dual connectivity (MR-DC) to UEs as described above, including E-UTRAN/NR Dual Connectivity (EN-DC).

Figure 16:
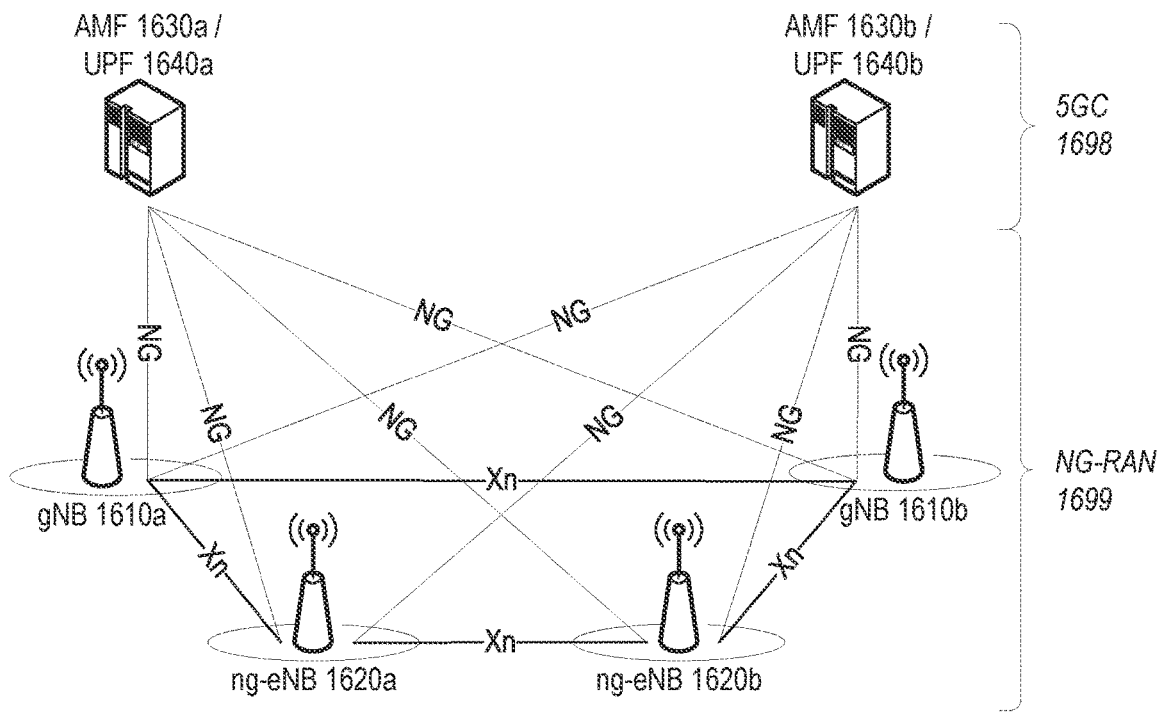
FIG. 16 shows a high-level view of an exemplary 5G network architecture, including a Next Generation Radio Access Network (NG-RAN) and a 5G Core (5GC).

FIG. 16 shows a high-level view of an exemplary 5G network architecture, including a Next Generation Radio Access Network (NG-RAN) 1699 and a 5G Core (5GC) 1698. As shown in the figure, NG-RAN 1699 can include gNBs 1610 (e.g., 1610*a,b*) and ng-eNBs 1620 (e.g., 1620*a, b*) that are interconnected with each other via respective Xn interfaces. The gNBs and ng-eNBs are also connected via the NG interfaces to 5GC 1698, more specifically to the AMF (Access and Mobility Management Function) 1630 (e.g., AMFs 1630*a,b*) via respective NG-C interfaces and to the UPF (User Plane Function) 1640 (e.g., UPFs 1640*a,b*) via respective NG-U interfaces.

NG-RAN 1699 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB can be connected to all 5GC nodes within an "AMF Region," which is defined in 3GPP TS 23.501. If security protection for CP and UP data on TNL of NG-RAN interfaces is supported, NDS/IP (3GPP TS 33.401) can be applied.

Each of the gNBs 1610a,b can support the NR radio interface, including frequency division duplexing (FDD), time division duplexing (TDD), or a combination thereof. In contrast, each of ng-eNBs 1620a,b supports the LTE radio interface but, unlike conventional LTE eNBs (e.g., eNBs 1510a,b shown in FIG. 15), connect to the 5GC via the NG interface. In addition, the gNBs 1610a,b and ng-eNBs 1620a,b can provide multi-RAT (radio access technology) dual connectivity (MR-DC) to UEs as described above, including NG-RAN E-UTRA/NR Dual Connectivity (NGEN-DC).

Each of the gNBs 1610a,b can include a central (or centralized) unit (CU or gNB-CU) and one or more distributed (or decentralized) units (DU or gNB-DU) Likewise, each of the en-gNBs 1520a,b shown in FIG. 15 can include a CU and one or more DUs. The CUs are logical nodes that host higher-layer protocols and perform various gNB functions such controlling the operation of DUs. Similarly, the DUs are logical nodes that host lower-layer protocols and can include various subsets of the gNB functions, depending on the functional split. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

Figure 17:
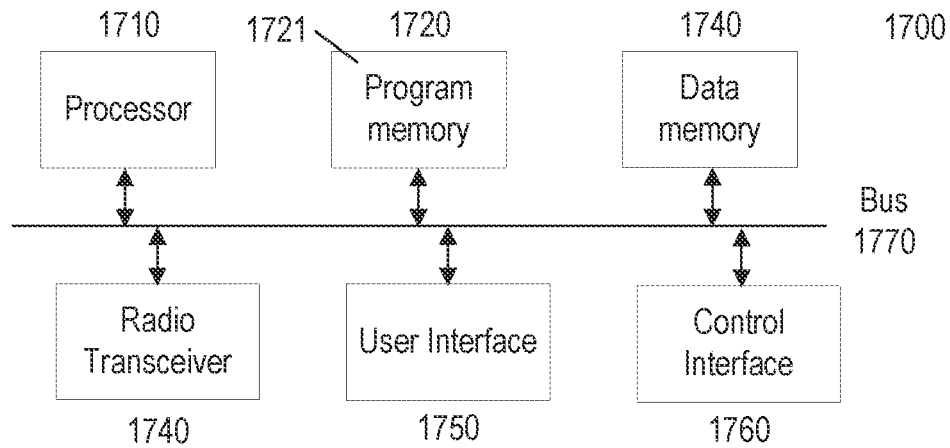
FIG. 17 is a block diagram of an exemplary wireless device or user equipment (UE), according to various exemplary embodiments of the present disclosure.

FIG. 17 shows a block diagram of an exemplary wireless device or user equipment (UE) 1700 according to various embodiments of the present disclosure. For example, exemplary device 1700 can be configured by execution of instructions, stored on a computer-readable medium, to perform operations corresponding to one or more of the exemplary methods and/or procedures described above.

Exemplary device 1700 can comprise a processor 1710 that can be operably connected to a program memory 1720 and/or a data memory 1730 via a bus 1770 that can comprise parallel address and data buses, serial ports, or other methods and/or structures known to those of ordinary skill in the art. Program memory 1720 can store software code, programs, and/or instructions (collectively shown as computer program product 1721 in FIG. 17) executed by processor 1710 that can configure and/or facilitate device 1700 to perform various operations, including operations described below. For example, execution of such instructions can configure and/or facilitate exemplary device 1700 to communicate using one or more wired or wireless communication protocols, including one or more wireless communication protocols standardized by 3GPP, 3GPP2, or IEEE, such as those commonly known as 5G/NR, LTE, LTE-A, UMTS, HSPA, GSM, GPRS, EDGE, 1xRTT, CDMA2000, 802.17 WiFi, HDMI, USB, Firewire, etc., or any other current or future protocols that can be utilized in conjunction with radio transceiver 1740, user interface 1750, and/or host interface 1760.

For example, processor 1710 can execute program code stored in program memory 1720 that corresponds to MAC, RLC, PDCP, and RRC layer protocols standardized by 3GPP (e.g., for NR and/or LTE). As a further example, processor 1710 can execute program code stored in program memory 1720 that, together with radio transceiver 1740, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

Program memory 1720 can also comprises software code executed by processor 1710 to control the functions of device 1700, including configuring and controlling various components such as radio transceiver 1740, user interface 1750, and/or host interface 1760. Program memory 1720 can also comprise one or more application programs and/or modules comprising computer-executable instructions embodying any of the exemplary methods and/or procedures described herein. Such software code can be specified or written using any known or future developed programming language, such as e.g., Java, C++, C, Objective C, HTML, XHTML, machine code, and Assembler, as long as the desired functionality, e.g., as defined by the implemented method steps, is preserved. In addition, or as an alternative, program memory 1720 can comprise an external storage arrangement (not shown) remote from device 1700, from which the instructions can be downloaded into program memory 1720 located within or removably coupled to device 1700, so as to enable execution of such instructions.

Data memory 1730 can comprise memory area for processor 1710 to store variables used in protocols, configuration, control, and other functions of device 1700, including operations corresponding to, or comprising, any of the exemplary methods and/or procedures described herein. Moreover, program memory 1720 and/or data memory 1730 can comprise non-volatile memory (e.g., flash memory), volatile memory (e.g., static or dynamic RAM), or a combination thereof. Furthermore, data memory 1730 can comprise a memory slot by which removable memory cards in one or more formats (e.g., SD Card, Memory Stick, Compact Flash, etc.) can be inserted and removed. Persons of ordinary skill in the art will recognize that processor 1710 can comprise multiple individual processors (including, e.g., multi-core processors), each of which implements a portion of the functionality described above. In such cases, multiple individual processors can be commonly connected to program memory 1720 and data memory 1730 or individually connected to multiple individual program memories and or data memories. More generally, persons of ordinary skill in the art will recognize that various protocols and other functions of device 1700 can be implemented in many different computer arrangements comprising different combinations of hardware and software including, but not limited to, application processors, signal processors, general-purpose processors, multi-core processors, ASICs, fixed and/or programmable digital circuitry, analog baseband circuitry, radio-frequency circuitry, software, firmware, and middleware.

A radio transceiver 1740 can comprise radio-frequency transmitter and/or receiver functionality that facilitates the device 1700 to communicate with other equipment supporting like wireless communication standards and/or protocols. In some exemplary embodiments, the radio transceiver 1740 includes a transmitter and a receiver that enable device 1700 to communicate with various 5G/NR networks according to various protocols and/or methods proposed for standardization by 3GPP and/or other standards bodies. For example, such functionality can operate cooperatively with processor 1710 to implement a PHY layer based on OFDM, OFDMA, and/or SC-FDMA technologies, such as described herein with respect to other figures.

In some exemplary embodiments, the radio transceiver 1740 includes an LTE transmitter and receiver that can facilitate the device 1700 to communicate with various LTE LTE-Advanced (LTE-A), and/or NR networks according to standards promulgated by 3GPP. In some exemplary embodiments of the present disclosure, the radio transceiver 1740 includes circuitry, firmware, etc. necessary for the device 1700 to communicate with various 5G/NR, LTE, LTE-A, UMTS, and/or GSM/EDGE networks, also according to 3GPP standards. In some exemplary embodiments of the present disclosure, radio transceiver 1740 includes circuitry, firmware, etc. necessary for the device 1700 to communicate with various CDMA2000 networks, according to 3GPP2 standards.

In some exemplary embodiments of the present disclosure, the radio transceiver 1740 is capable of communicating using radio technologies that operate in unlicensed frequency bands, such as IEEE 802.17 WiFi that operates using frequencies in the regions of 2.4, 5.6, and/or 60 GHz. In some exemplary embodiments of the present disclosure, radio transceiver 1740 can comprise a transceiver that is capable of wired communication, such as by using IEEE 802.3 Ethernet technology. The functionality particular to each of these embodiments can be coupled with or controlled by other circuitry in the device 1700, such as the processor 1710 executing program code stored in program memory 1720 in conjunction with, or supported by, data memory 1730.

User interface 1750 can take various forms depending on the particular embodiment of device 1700, or can be absent from device 1700 entirely. In some exemplary embodiments, user interface 1750 can comprise a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the device 1700 can comprise a tablet computing device including a larger touchscreen display. In such embodiments, one or more of the mechanical features of the user interface 1750 can be replaced by comparable or functionally equivalent virtual user interface features (e.g., virtual keypad, virtual buttons, etc.) implemented using the touchscreen display, as familiar to persons of ordinary skill in the art. In other embodiments, the device 1700 can be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many exemplary embodiments of the device 1700 having a touch screen display are capable of receiving user inputs, such as inputs related to exemplary methods and/or procedures described herein or otherwise known to persons of ordinary skill in the art.

In some exemplary embodiments of the present disclosure, device 1700 can comprise an orientation sensor, which can be used in various ways by features and functions of device 1700. For example, the device 1700 can use outputs of the orientation sensor to determine when a user has changed the physical orientation of the device 1700's touch screen display. An indication signal from the orientation sensor can be available to any application program executing on the device 1700, such that an application program can change the orientation of a screen display (e.g., from portrait to landscape) automatically when the indication signal indicates an approximate 170-degree change in physical orientation of the device. In this exemplary manner, the application program can maintain the screen display in a manner that is readable by the user, regardless of the physical orientation of the device. In addition, the output of the orientation sensor can be used in conjunction with various exemplary embodiments of the present disclosure.

A control interface 1760 of the device 1700 can take various forms depending on the particular exemplary embodiment of device 1700 and of the particular interface requirements of other devices that the device 1700 is intended to communicate with and/or control. For example, the control interface 1760 can comprise an RS-232 interface, an RS-485 interface, a USB interface, an HDMI interface, a Bluetooth interface, an IEEE ("Firewire") interface, an $I^2C$ interface, a PCMCIA interface, or the like. In some exemplary embodiments of the present disclosure, control interface 1760 can comprise an IEEE 802.3 Ethernet interface such as described above. In some exemplary embodiments of the present disclosure, the control interface 1760 can comprise analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the device 1700 can comprise more functionality than is shown in FIG. 17 including, for example, a video and/or still-image camera, microphone, media player and/or recorder, etc. Moreover, radio transceiver 1740 can include circuitry necessary to communicate using additional radio-frequency communication standards including Bluetooth, GPS, and/or others. Moreover, the processor 1710 can execute software code stored in the program memory 1720 to control such additional functionality. For example, directional velocity and/or position estimates output from a GPS receiver can be available to any application program executing on the device 1700, including various exemplary methods and/or computer-readable media according to various exemplary embodiments of the present disclosure.

Figure 18:
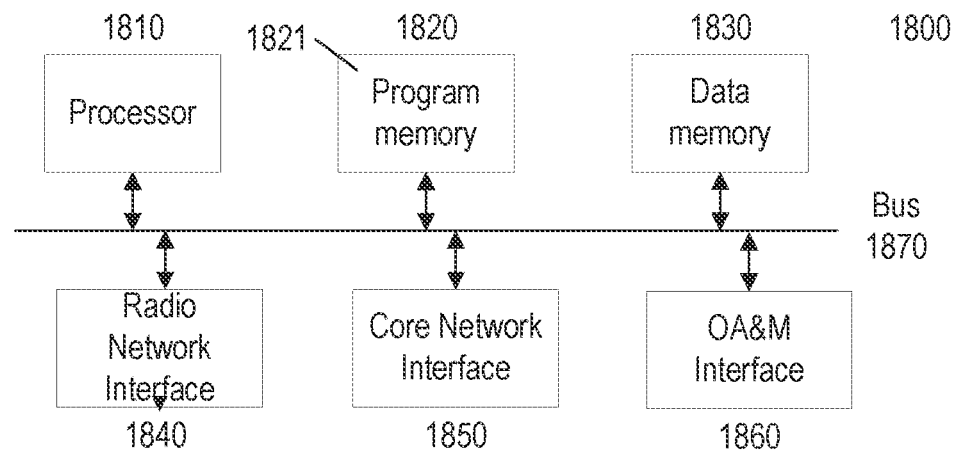
FIG. 18 is a block diagram of an exemplary network node (e.g., a base station, eNB, or gNB), according to various exemplary embodiments of the present disclosure.

FIG. 18 shows a block diagram of an exemplary network node 1800 according to various embodiments of the present disclosure. For example, exemplary network node 1800 can be configured by execution of instructions, stored on a computer-readable medium, to perform operations corresponding to one or more of the exemplary methods and/or procedures described above. In some exemplary embodiments, network node 1800 can comprise a base station, eNB, gNB, or one or more components thereof. For example, network node 1800 can be configured as a central unit (CU) and one or more distributed units (DUs) according to NR gNB architectures specified by 3GPP. More generally, the functionally of network node 1800 can be distributed across various physical devices and/or functional units, modules, etc.

Network node 1800 comprises processor 1810 which is operably connected to program memory 1820 and data memory 1830 via bus 1870, which can comprise parallel address and data buses, serial ports, or other methods and/or structures known to those of ordinary skill in the art.

Program memory 1820 can store software code, programs, and/or instructions (collectively shown as computer program product 1821 in FIG. 18) executed by processor 1810 that can configure and/or facilitate network node 1600 to perform various operations, including operations described herein. For example, execution of such stored instructions can configure network node 1800 to communicate with one or more other devices using protocols according to various embodiments of the present disclosure, including one or more exemplary methods and/or procedures discussed above. Furthermore, execution of such stored instructions can also configure and/or facilitate network node 1800 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with radio network interface 1840 and core network interface 1850. By way of example and without limitation, core network interface 1850 can comprise the S1 interface and radio network interface 1850 can comprise the Uu interface, as standardized by 3GPP. Program memory 1820 can further comprise software code executed by processor 1810 to control the functions of network node 1800, including configuring and controlling various components such as radio network interface 1840 and core network interface 1850.

Data memory 1830 can comprise memory area for processor 1810 to store variables used in protocols, configuration, control, and other functions of network node 1800. As such, program memory 1820 and data memory 1830 can comprise non-volatile memory (e.g., flash memory, hard disk, etc.), volatile memory (e.g., static or dynamic RAM), networK-based (e.g., "cloud") storage, or a combination thereof. Persons of ordinary skill in the art will recognize that processor 1810 can comprise multiple individual processors (not shown), each of which implements a portion of the functionality described above. In such case, multiple individual processors may be commonly connected to program memory 1820 and data memory 1830 or individually connected to multiple individual program memories and/or data memories. More generally, persons of ordinary skill in the art will recognize that various protocols and other functions of network node 1800 may be implemented in many different combinations of hardware and software including, but not limited to, application processors, signal processors, general-purpose processors, multi-core processors, ASICs, fixed digital circuitry, programmable digital circuitry, analog baseband circuitry, radio-frequency circuitry, software, firmware, and middleware.

Radio network interface 1840 can comprise transmitters, receivers, signal processors, ASICs, antennas, beamforming units, and other circuitry that enables network node 1800 to communicate with other equipment such as, in some embodiments, a plurality of compatible user equipment (UE). In some exemplary embodiments, radio network interface can comprise various protocols or protocol layers, such as the PHY, MAC, RLC, PDCP, and RRC layer protocols standardized by 3GPP for LTE, LTE-A, and/or 5G/NR; improvements thereto such as described herein above; or any other higher-layer protocols utilized in conjunction with radio network interface 1840. According to further exemplary embodiments of the present disclosure, the radio network interface 1840 can comprise a PHY layer based on OFDM, OFDMA, and/or SC-FDMA technologies. In some embodiments, the functionality of such a PHY layer can be provided cooperatively by radio network interface 1840 and processor 1810 (including program code in memory 1820).

Core network interface 1850 can comprise transmitters, receivers, and other circuitry that enables network node 1800 to communicate with other equipment in a core network such as, in some embodiments, circuit-switched (CS) and/or packet-switched Core (PS) networks. In some embodiments, core network interface 1850 can comprise the S1 interface standardized by 3GPP. In some embodiments, core network interface 1850 can comprise the NG interface standardized by 3GPP. In some exemplary embodiments, core network interface 1850 can comprise one or more interfaces to one or more SGWs, MMEs, SGSNs, GGSNs, and other physical devices that comprise functionality found in GERAN, UTRAN, EPC, 5GC, and CDMA2000 core networks that are known to persons of ordinary skill in the art. In some embodiments, these one or more interfaces may be multiplexed together on a single physical interface. In some embodiments, lower layers of core network interface 1850 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

OA&M interface 1860 can comprise transmitters, receivers, and other circuitry that enables network node 1800 to communicate with external networks, computers, databases, and the like for purposes of operations, administration, and maintenance of network node 1800 or other network equipment operably connected thereto. Lower layers of OA&M interface 1860 can comprise one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art. Moreover, in some embodiments, one or more of radio network interface 1840, core network interface 1850, and OA&M interface 1860 may be multiplexed together on a single physical interface, such as the examples listed above.

Figure 19:
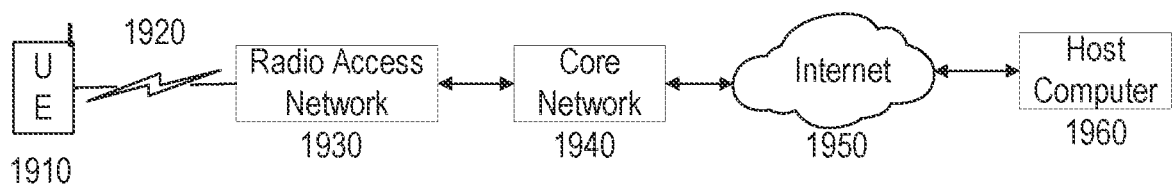
FIG. 19 is a block diagram of an exemplary network configuration usable to provide over-the-top (OTT) data services between a host computer and a user equipment, according to various exemplary embodiments of the present disclosure.

FIG. 19 is a block diagram of an exemplary communication network configured to provide over-the-top (OTT) data services between a host computer and a user equipment (UE), according to one or more exemplary embodiments of the present disclosure. UE 1910 can communicate with radio access network (RAN) 1930 over radio interface 1920, which can be based on protocols described above including, e.g., LTE, LTE-A, and 5G/NR. For example, UE 1910 can be configured and/or arranged as shown in other figures discussed above. RAN 1930 can include one or more network nodes (e.g., base stations, eNBs, gNBs, controllers, etc.) operable in licensed spectrum bands, as well one or more network nodes operable in unlicensed spectrum (using, e.g., LAA or NR-U technology), such as a 2.4- and/or a 5-GHz band. In such cases, the network nodes comprising RAN 1930 can cooperatively operate using licensed and unlicensed spectrum.

RAN 1930 can further communicate with core network 1940 according to various protocols and interfaces described above. For example, one or more apparatus (e.g., base stations, eNBs, gNBs, etc.) comprising RAN 1930 can communicate to core network 1940 via core network interface 1950 described above. In some exemplary embodiments, RAN 1930 and core network 1940 can be configured and/or arranged as shown in other figures discussed above. For example, eNBs comprising an E-UTRAN 1930 can communicate with an EPC core network 1940 via an S1 interface. As another example, gNBs comprising a NR RAN 1930 can communicate with a 5GC core network 1930 via an NG interface. In some embodiments, RAN 1930 can comprise both eNBs and gNBs (or variants thereof), e.g., for supporting both LTE and 5G/NR access by UEs.

Core network 1940 can further communicate with an external packet data network, illustrated in FIG. 19 as Internet 1950, according to various protocols and interfaces known to persons of ordinary skill in the art. Many other devices and/or networks can also connect to and communicate via Internet 1950, such as exemplary host computer 1960. In some exemplary embodiments, host computer 1960 can communicate with UE 1910 using Internet 1950, core network 1940, and RAN 1930 as intermediaries. Host computer 1960 can be a server (e.g., an application server) under ownership and/or control of a service provider. Host computer 1960 can be operated by the OTT service provider or by another entity on the service provider's behalf.

For example, host computer 1960 can provide an over-the-top (OTT) packet data service to UE 1910 using facilities of core network 1940 and RAN 1930, which can be unaware of the routing of an outgoing/incoming communication to/from host computer 1960. Similarly, host computer 1960 can be unaware of routing of a transmission from the host computer to the UE, e.g., the routing of the transmission through RAN 1930. Various OTT services can be provided using the exemplary configuration shown in FIG. 19 including, e.g., streaming (unidirectional) audio and/or video from host computer to UE, interactive (bidirectional) audio and/or video between host computer and UE, interactive messaging or social communication, interactive virtual or augmented reality, etc.

The exemplary network shown in FIG. 19 can also include measurement procedures and/or sensors that monitor network performance metrics including data rate, latency and other factors that are improved by exemplary embodiments disclosed herein. The exemplary network can also include functionality for reconfiguring the link between the endpoints (e.g., host computer and UE) in response to variations in the measurement results. Such procedures and functionalities are known and practiced; if the network hides or abstracts the radio interface from the OTT service provider, measurements can be facilitated by proprietary signaling between the UE and the host computer.

The exemplary embodiments described herein provide efficient techniques for RAN 1930 to map reference signals (RS) at a multi-user transmitter when non-linear precoding (NLP) is applied, thereby facilitating correct data demodulation at the receiver. For example, by not introducing non-linear distortion into the RS used for channel estimation and phase tracking, such techniques can enable the receiver to estimate the effective channel that can be used for data demodulation. At the same time, such techniques enable a receiver to measure non-linear interference resulting from the NLP at the transmitter. In this manner, such techniques facilitate deployment of NLP in networks (e.g., RAN 1930) and compatible UE receivers (e.g., UE 1910), thereby realizing the network capacity gains over linear precoding. This enables networks to support more users for OTT services, and also allows more UEs to access such OTT services.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various different exemplary embodiments can be used together with one another, as well as interchangeably therewith, as should be understood by those with ordinary skill in the art.

In addition, certain terms used in the present disclosure, including the specification, drawings and exemplary embodiments thereof, can be used synonymously in certain instances, including, but not limited to, e.g., data and information. It should be understood that although these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The invention claimed is:

1. A method for operating a network node in a wireless network, the method comprising:
   multiplexing a first data stream with a second reference signal (RS) stream;
   applying non-linear precoding to the multiplexed combination of the first data stream and the second RS stream to remove a representation of expected inter-stream interference due to a second data stream, thereby generating a corrected first data stream and a corrected second RS stream;
   applying linear precoding to the corrected first data stream, to the corrected second RS stream, and to a first RS stream to generate a first signal layer, wherein the first RS stream is not corrected for the expected inter-stream interference before applying the linear precoding; and
   transmitting the first signal layer to a user equipment (UE).

2. The method of claim 1, wherein:
   the first RS stream is related to one or more first ports of RS that are associated with the first data stream; and
   each of the first ports corresponds to one of the following types of RS: demodulation RS (DM-RS), phase-tracking RS (PT-RS), and channel state information RS (CSI-RS).

3. The method of claim 2, wherein:
   a particular first port corresponds to DM-RS; and
   a further first port corresponds to PT-RS.

4. The method of claim 2, wherein:
   a particular first port corresponds to DM-RS;
   a further first port corresponds to DM-RS; and
   the particular first port and the further first port are time-multiplexed with the corrected first data stream.

5. The method of claim 1, wherein:
   the first and second data streams are associated with respective first and second users; and
   applying non-linear precoding to the first data stream comprises performing a modulo operation on a combination of the first data stream and a representation of a second signal layer associated with the second user; and
   the modulo operation is performed with respect to a maximum transmit power constraint and a modulation and coding scheme (MCS) used to transmit the first data stream.

6. The method of claim 5, further comprising sending, to the UE, an indication of the MCS.

7. The method of claim 5, wherein:
the method further comprises applying linear precoding to the second data stream to generate the second signal layer; and
applying non-linear precoding to the first data stream further comprises applying a feedback filter to the second signal layer to generate the representation of the second signal layer.

8. The method of claim 1, wherein the second RS stream comprises second channel state information RS (CSI-RS) that are configured to facilitate inter-user interference measurements by the UE.

9. The method of claim 1, wherein the first RS stream comprises first channel state information RS (CSI-RS) that are configured to facilitate same-user channel measurements by the UE.

10. A method for operating a user equipment (UE) in a wireless network, the method comprising:
receiving a first signal layer transmitted by a network node in the wireless network, wherein:
the first signal layer has been generated by the network node by applying linear precoding to a corrected first data stream, to a corrected second reference signal (RS) stream, and to a first RS stream; and
the corrected first data stream and the corrected second RS stream have been generated by the network node by applying non-linear precoding to a multiplexed combination of a first data stream with a second RS stream; and
performing one or more first measurements based on the first RS stream.

11. The method of claim 10, further comprising applying linear filtering to the received first signal layer to generate the first data stream and the first RS stream.

12. The method of claim 10, wherein:
the first RS stream is related to one or more first ports of RS that are associated with the first data stream; and
each of the first ports corresponds to one of the following types of RS: demodulation RS (DM-RS); phase-tracking RS (PT-RS); and channel state information RS (CSI-RS).

13. The method of claim 12, wherein:
a particular first port corresponds to DM-RS; and
a further first port corresponds to PT-RS.

14. The method of claim 12, wherein:
a particular first port corresponds to DM-RS;
a further first port corresponds to DM-RS; and
the particular first port and the further first port are time-multiplexed with the corrected first data stream.

15. The method of claim 10, further comprising performing one or more second measurements based on the corrected second RS stream.

16. The method of claim 15, wherein:
the second RS stream comprises one or more second channel state information RS (CSI-RS); and
the second measurements comprise inter-user interference measurements based on the corrected second CSI-RS.

17. The method of claim 10, wherein:
the first RS stream comprises one or more first channel state information RS (CSI-RS); and
the first measurements comprise same-user channel measurements based on the first CSI-RS.

18. The method of claim 10, wherein:
the first data stream comprises a plurality of data symbols; and
the method further comprises demodulating the data symbols comprising the corrected first data stream.

19. A network node in a wireless network, the network node comprising:
a radio network interface configured to communicate with one or more user equipment (UEs); and
processing circuitry operatively coupled with the radio network interface, whereby the processing circuitry and the radio network interface are configured to:
multiplex a first data stream with a second reference signal (RS) stream;
apply non-linear precoding to the multiplexed combination of the first data stream and the second RS stream to remove a representation of expected inter-stream interference due to a second data stream, thereby generating a corrected first data stream and a corrected second RS stream;
apply linear precoding to the corrected first data stream, to the corrected second RS stream, and to a first RS stream to generate a first signal layer, wherein the first RS stream is not corrected for the expected inter-stream interference before applying the linear precoding; and
transmit the first signal layer to a UE.

20. A user equipment (UE) comprising:
a radio transceiver configured for communicating with a network node in a wireless network; and
processing circuitry operatively coupled with the radio transceiver, whereby the processing circuitry and the radio transceiver are configured to perform operations corresponding to the method of claim 10.

\* \* \* \* \*